(12) United States Patent
Johnke et al.

(10) Patent No.: US 9,933,207 B2
(45) Date of Patent: Apr. 3, 2018

(54) HYDROCARBON GAS PROCESSING

(75) Inventors: Andrew F. Johnke, Beresford, SD (US); W. Larry Lewis, Houston, TX (US); John D. Wilkinson, Midland, TX (US); Joe T. Lynch, Midland, TX (US); Hank M. Hudson, Midland, TX (US); Kyle T. Cuellar, Katy, TX (US)

(73) Assignees: Ortloff Engineers, Ltd., Midland, TX (US); S.M.E. Products LP, Houston, TX (US)

( * ) Notice: Subject to any disclaimer, the term of this patent is extended or adjusted under 35 U.S.C. 154(b) by 1227 days.

(21) Appl. No.: 12/772,472

(22) Filed: May 3, 2010

(65) Prior Publication Data
US 2010/0287983 A1    Nov. 18, 2010

Related U.S. Application Data

(63) Continuation-in-part of application No. 12/750,862, filed on Mar. 31, 2010, which is a
(Continued)

(51) Int. Cl.
*F25J 3/02* (2006.01)
*C10G 5/06* (2006.01)

(52) U.S. Cl.
CPC .............. *F25J 3/0238* (2013.01); *C10G 5/06* (2013.01); *F25J 3/0209* (2013.01); *F25J 3/0219* (2013.01); *F25J 3/0233* (2013.01); *F25J 3/0242* (2013.01); *C10G 2400/20* (2013.01); *F25J 2200/02* (2013.01); *F25J 2200/30* (2013.01); *F25J 2200/70* (2013.01); *F25J 2200/78* (2013.01); *F25J 2200/80* (2013.01);
(Continued)

(58) Field of Classification Search
CPC ......... F25J 3/0209; F25J 3/0233; F25J 3/0238
USPC .................. 62/618, 620, 621, 625
See application file for complete search history.

(56) References Cited

U.S. PATENT DOCUMENTS

| 33,408 A | 10/1861 | Turner et al. ................. 68/22 R |
| 3,292,380 A | 12/1966 | Bucklin ......................... 62/621 |

(Continued)

OTHER PUBLICATIONS

"Dew Point Control Gas Conditioning Units," SME Products Brochure, Gas Processors Assoc. Conference (Apr. 5, 2009).

(Continued)

*Primary Examiner* — John F Pettitt
(74) *Attorney, Agent, or Firm* — Fitzpatrick, Cella, Harper & Scinto

(57) ABSTRACT

A process and an apparatus are disclosed for a compact processing assembly to recover ethane, ethylene, and heavier hydrocarbon components from a hydrocarbon gas stream. The gas stream is cooled and divided into first and second streams. The first stream is further cooled, expanded to lower pressure, heated, and its liquid fraction is supplied as a first top feed to an absorbing means. The second stream is expanded to lower pressure and supplied as a bottom feed to the absorbing means. A distillation vapor stream from the absorbing means is combined with the vapor fraction of the first stream, then cooled by the expanded first stream to form a condensed stream that is supplied as a second top feed to the absorbing means. A distillation liquid stream from the bottom of the absorbing means is heated in a heat and mass transfer means to strip out its volatile components.

48 Claims, 6 Drawing Sheets

Figure 1:
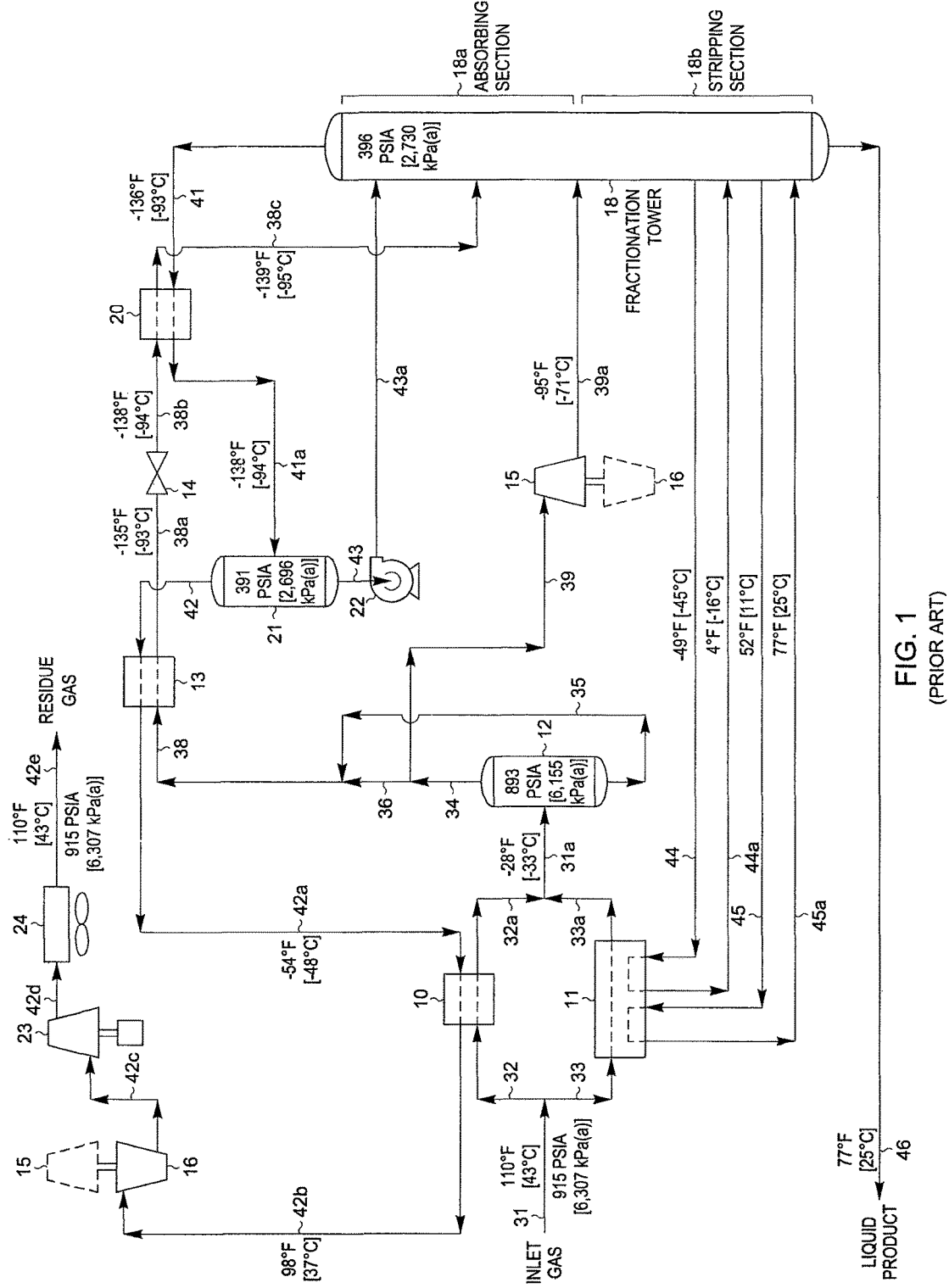

Related U.S. Application Data continuation-in-part of application No. 12/717,394, filed on Mar. 4, 2010, which is a continuation-in-part of application No. 12/689,616, filed on Jan. 19, 2010, which is a continuation-in-part of application No. 12/372,604, filed on Feb. 17, 2009.

(60) Provisional application No. 61/186,361, filed on Jun. 11, 2009.

(52) U.S. Cl.
CPC ........ *F25J 2205/04* (2013.01); *F25J 2210/06* (2013.01); *F25J 2210/12* (2013.01); *F25J 2240/02* (2013.01); *F25J 2270/12* (2013.01); *F25J 2270/60* (2013.01); *F25J 2290/40* (2013.01); *F25J 2290/42* (2013.01); *Y02C 20/20* (2013.01)

(56) References Cited

U.S. PATENT DOCUMENTS

| | | | |
|---|---|---|---|
| 3,477,915 A | 11/1969 | Gantt et al. | |
| 3,508,412 A | 4/1970 | Yearout | |
| 3,516,261 A | 6/1970 | Hoffman | |
| 3,625,017 A | 12/1971 | Hoffman | |
| 3,797,261 A | 3/1974 | Juncker et al. | |
| 3,969,450 A * | 7/1976 | Hengstebeck | B01D 3/166 202/158 |
| 3,983,711 A | 10/1976 | Solomon | 62/630 |
| 4,061,481 A | 12/1977 | Campbell et al. | 62/621 |
| 4,127,009 A | 11/1978 | Phillips | |
| 4,140,504 A | 2/1979 | Campbell et al. | 62/621 |
| 4,157,904 A | 6/1979 | Campbell et al. | 62/623 |
| 4,171,964 A | 10/1979 | Campbell et al. | 62/621 |
| 4,185,978 A | 1/1980 | McGalliard et al. | 62/634 |
| 4,251,249 A | 2/1981 | Gulsby | 62/621 |
| 4,278,457 A | 7/1981 | Campbell et al. | 62/621 |
| 4,519,824 A | 5/1985 | Huebel | 62/621 |
| 4,617,039 A | 10/1986 | Buck | 62/621 |
| 4,687,499 A | 8/1987 | Aghili | 62/621 |
| 4,689,063 A | 8/1987 | Paradowski et al. | 62/621 |
| 4,690,702 A | 9/1987 | Paradowski et al. | 62/621 |
| 4,854,955 A | 8/1989 | Campbell et al. | 62/621 |
| 4,869,740 A | 9/1989 | Campbell et al. | 62/621 |
| 4,889,545 A | 12/1989 | Campbell et al. | 62/621 |
| 5,255,528 A | 10/1993 | Dao | |
| 5,275,005 A | 1/1994 | Campbell et al. | 62/621 |
| 5,316,628 A | 5/1994 | Collin et al. | |
| 5,335,504 A | 8/1994 | Durr et al. | 62/632 |
| 5,339,654 A | 8/1994 | Cook et al. | |
| 5,367,884 A | 11/1994 | Phillips et al. | |
| 5,410,885 A | 5/1995 | Smolarek et al. | |
| 5,555,748 A | 9/1996 | Campbell et al. | 62/621 |
| 5,566,554 A | 10/1996 | Vijayaraghavan et al. | 62/621 |
| 5,568,737 A | 10/1996 | Campbell et al. | 62/621 |
| 5,675,054 A | 10/1997 | Manley et al. | |
| 5,685,170 A | 11/1997 | Sorensen | |
| 5,713,216 A | 2/1998 | Erickson | |
| 5,771,712 A | 6/1998 | Campbell et al. | 62/621 |
| 5,799,507 A | 9/1998 | Wilkinson et al. | 62/621 |
| 5,881,569 A | 3/1999 | Campbell et al. | 62/621 |
| 5,890,377 A | 4/1999 | Foglietta | |
| 5,890,378 A | 4/1999 | Rambo et al. | 62/621 |
| 5,942,164 A | 8/1999 | Tran | |
| 5,983,664 A | 11/1999 | Campbell et al. | 62/621 |
| 6,182,469 B1 | 2/2001 | Campbell et al. | 62/621 |
| 6,361,582 B1 | 3/2002 | Pinnau et al. | |
| 6,516,631 B1 | 2/2003 | Trebble | 62/630 |
| 6,565,626 B1 | 5/2003 | Baker et al. | |
| 6,578,379 B2 | 6/2003 | Paradowski | 62/622 |
| 6,694,775 B1 | 2/2004 | Higginbotham et al. | |
| 6,712,880 B2 | 3/2004 | Foglietta et al. | 95/184 |
| 6,915,662 B2 | 7/2005 | Wilkinson et al. | 62/621 |
| 7,165,423 B2 | 1/2007 | Winningham | 62/620 |
| 7,191,617 B2 | 3/2007 | Cuellar et al. | 62/628 |
| 7,210,311 B2 | 5/2007 | Wilkinson et al. | 62/611 |
| 7,219,513 B1 | 5/2007 | Mostafa | 62/620 |
| 2002/0166336 A1 | 11/2002 | Wilkinson et al. | |
| 2004/0079107 A1 | 4/2004 | Wilkinson et al. | |
| 2004/0172967 A1 | 9/2004 | Patel et al. | |
| 2005/0229634 A1 | 10/2005 | Huebel et al. | |
| 2005/0247078 A1 | 11/2005 | Wilkinson et al. | |
| 2005/0268649 A1 | 12/2005 | Wilkinson et al. | 62/613 |
| 2006/0032269 A1 | 2/2006 | Cuellar et al. | 62/620 |
| 2006/0086139 A1 | 4/2006 | Eaton et al. | |
| 2006/0283207 A1 | 12/2006 | Pitman et al. | 62/620 |
| 2008/0000265 A1 | 1/2008 | Cuellar et al. | 62/630 |
| 2008/0078205 A1 | 4/2008 | Cuellar et al. | 62/620 |
| 2008/0190136 A1 | 8/2008 | Pitman et al. | 62/620 |
| 2008/0271480 A1 | 11/2008 | Mak | 62/626 |
| 2009/0100862 A1 | 4/2009 | Wilkinson et al. | 62/620 |
| 2009/0107175 A1 | 4/2009 | Patel et al. | 62/620 |
| 2010/0236285 A1 | 9/2010 | Johnke et al. | 62/620 |
| 2010/0251764 A1 | 10/2010 | Johnke et al. | 62/620 |
| 2010/0275647 A1 | 11/2010 | Johnke et al. | 62/620 |
| 2010/0287984 A1 | 11/2010 | Johnke et al. | 62/620 |
| 2010/0326134 A1 | 12/2010 | Johnke et al. | 62/620 |
| 2011/0226011 A1 | 9/2011 | Johnke et al. | |
| 2011/0226012 A1 | 9/2011 | Johnke et al. | |
| 2011/0226013 A1 | 9/2011 | Johnke et al. | |
| 2011/0226014 A1 | 9/2011 | Johnke et al. | |
| 2011/0232328 A1 | 9/2011 | Johnke et al. | |

OTHER PUBLICATIONS

"Fuel Gas Conditioning Units for Compressor Engines," SME Products Brochure, Gas Processors Assoc. Conference (Apr. 5, 2009).

"P&ID Fuel Gas Conditioner," Drawing No. SMEP-901, Date Drawn: Aug. 29, 2007, SME, available at http://www.sme-llc.com/sme.cfm?a=prd&catID=58&subID=44&prdID=155 (Apr. 24, 2009).

"Fuel Gas Conditioner Preliminary Arrangement," Drawing No. SMP-1007-00, Date Drawn: Nov. 11, 2008, SME, available at http://www.sme-llc.com/sme.cfm?a=prd&catID=58&subID=44&prdID=155 (Apr. 24, 2009).

"Product: Fuel Gas Conditioning Units," SME Associates, LLC, available at http://www.sme-llc.com/sme.cfm?a=prd&catID=58&subID=44&prdID=155 (Apr. 24, 2009).

Mowrey, E. Ross., "Efficient, High Recovery of Liquids from Natural Gas Utilizing a High Pressure Absorber," Proceedings of the Eighty-First Annual Convention of the Gas Processors Association, Dallas, Texas, Mar. 11-13, 2002—10 pages.

International Search Report and Written Opinion issued in International Application No. PCT/US2010/21364 dated Mar. 29, 2010—20 pages.

International Search Report and Written Opinion issued in International Application No. PCT/US2010/26185 dated Jul. 9, 2010—20 pages.

International Search Report and Written Opinion issued in International Application No. PCT/US2010/29331 dated Jul. 2, 2010—15 pages.

International Search Report and Written Opinion issued in corresponding International Application No. PCT/US2010/033374 dated Jul. 9, 2010—18 pages.

International Search Report and Written Opinion issued in International Application No. PCT/US2010/35121 dated Jul. 19, 2010—18 pages.

International Search Report and Written Opinion issued in International Application No. PCT/US2010/37098 dated Aug. 17, 2010—12 pages.

International Search Report and Written Opinion issued in International Application No. PCT/US2011/028872 dated May 18, 2011—6 pages.

International Search Report and Written Opinion issued in International Application No. PCT/US2011/29234 dated May 20, 2011—29 pages.

(56) References Cited

OTHER PUBLICATIONS

International Search Report and Written Opinion issued in International Application No. PCT/US2011/029034 dated Jul. 27, 2011—39 pages.
International Search Report and Written Opinion issued in International Application No. PCT/US2011/029409 dated May 17, 2011—14 pages.
International Search Report and Written Opinion issued in International Application No. PCT/US2011/029239 dated May 20, 2011—20 pages.
Supplemental Notice of Allowability issued in U.S. Appl. No. 12/689,616, dated Feb. 10, 2015 (12 pages).
Comments on Statement of Reasons for Allowance filed in U.S. Appl. No. 12/689,616, dated Mar. 3, 2015 (7 pages).
Response and Statement of Interview filed in U.S. Appl. No. 13/052,575, dated Mar. 16, 2015 (37 pages).
Response and Statement of Interview filed in U.S. Appl. No. 13/052,348, dated Mar. 17, 2015 (37 pages).
Response and Statement of Interview filed in U.S. Appl. No. 13/053,792, dated Mar. 18, 2015 (37 pages).
Response, Statement of Interview and Petition for Extension of Time filed in U.S. Appl. No. 13/051,682, dated Mar. 19, 2015 (37 pages).
Response, Statement of Interview and Petition for Extension of Time filed in U.S. Appl. No. 13/048,315, dated Mar. 20, 2015 (93 pages).
Amendment and Statement of Interview filed in U.S. Appl. No. 13/052,348, dated Mar. 26, 2015 (23 pages).
Amendment and Statement of Interview filed in U.S. Appl. No. 13/051,682, dated Mar. 26, 2015 (29 pages).
Amendment and Statement of Interview filed in U.S. Appl. No. 13/053,792, dated Mar. 26, 2015 (25 pages).
Amendment and Statement of Interview filed in U.S. Appl. No. 13/052,575, dated Mar. 26, 2015 (20 pages).
Notice of Allowance and Fee(s) Due issued in U.S. Appl. No. 12/689,616, dated Jan. 9, 2015 (15 pages).
Comments on Statement of Reasons for Allowance filed in U.S. Appl. No. 12/689,616, dated Jan. 30, 2015 (8 pages).
Advisory Action Before the Filing of an Appeal Brief issued in U.S. Appl. No. 12/689,616, dated Nov. 28, 2014 (3 pages).
Submission Under 37 C.F.R. § 1.114, Statement of Interview, and Petition for Extension of Time filed in U.S. Appl. No. 12/689,616, dated Dec. 8, 2014 (39 pages).
Office Action issued in U.S. Appl. No. 13/052,348, dated Dec. 17, 2014 (13 pages).
Office Action issued in U.S. Appl. No. 13/051,682, dated Dec. 18, 2014 (13 pages).
Office Action issued in U.S. Appl. No. 13/053,792, dated Dec. 18, 2014 (20 pages).
Office Action issued in U.S. Appl. No. 13/052,575, dated Dec. 16, 2014 (16 pages).

\* cited by examiner

HYDROCARBON GAS PROCESSING

This invention relates to a process and apparatus for the separation of a gas containing hydrocarbons. The applicants claim the benefits under Title 35, United States Code, Section 119(e) of prior U.S. Provisional Application No. 61/186,361 which was filed on Jun. 11, 2009. The applicants also claim the benefits under Title 35, United States Code, Section 120 as a continuation-in-part of U.S. patent application Ser. No. 12/750,862 which was filed on Mar. 31, 2010, and as a continuation-in-part of U.S. patent application Ser. No. 12/717,394 which was filed on Mar. 4, 2010, and as a continuation-in-part of U.S. patent application Ser. No. 12/689,616 which was filed on Jan. 19, 2010, and as a continuation-in-part of U.S. patent application Ser. No. 12/372,604 which was filed on Feb. 17, 2009. Assignees S.M.E. Products LP and Ortloff Engineers, Ltd. were parties to a joint research agreement that was in effect before the invention of this application was made.

BACKGROUND OF THE INVENTION

Ethylene, ethane, propylene, propane, and/or heavier hydrocarbons can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, i.e., methane and ethane together comprise at least 50 mole percent of the gas. The gas also contains relatively lesser amounts of heavier hydrocarbons such as propane, butanes, pentanes, and the like, as well as hydrogen, nitrogen, carbon dioxide, and other gases.

The present invention is generally concerned with the recovery of ethylene, ethane, propylene, propane, and heavier hydrocarbons from such gas streams. A typical analysis of a gas stream to be processed in accordance with this invention would be, in approximate mole percent, 90.3% methane, 4.0% ethane and other $C_2$ components, 1.7% propane and other $C_3$ components, 0.3% iso-butane, 0.5% normal butane, and 0.8% pentanes plus, with the balance made up of nitrogen and carbon dioxide. Sulfur containing gases are also sometimes present.

The historically cyclic fluctuations in the prices of both natural gas and its natural gas liquid (NGL) constituents have at times reduced the incremental value of ethane, ethylene, propane, propylene, and heavier components as liquid products. This has resulted in a demand for processes that can provide more efficient recoveries of these products, for processes that can provide efficient recoveries with lower capital investment, and for processes that can be easily adapted or adjusted to vary the recovery of a specific component over a broad range. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas being processed. Depending upon the pressure of the gas source, the richness (ethane, ethylene, and heavier hydrocarbons content) of the gas, and the desired end products, each of these processes or a combination thereof may be employed.

The cryogenic expansion process is now generally preferred for natural gas liquids recovery because it provides maximum simplicity with ease of startup, operating flexibility, good efficiency, safety, and good reliability. U.S. Pat. Nos. 3,292,380; 4,061,481; 4,140,504; 4,157,904; 4,171,964; 4,185,978; 4,251,249; 4,278,457; 4,519,824; 4,617,039; 4,687,499; 4,689,063; 4,690,702; 4,854,955; 4,869,740; 4,889,545; 5,275,005; 5,555,748; 5,566,554; 5,568,737; 5,771,712; 5,799,507; 5,881,569; 5,890,378; 5,983,664; 6,182,469; 6,578,379; 6,712,880; 6,915,662; 7,191,617; 7,219,513; reissue U.S. Pat. No. 33,408; and co-pending application Ser. Nos. 11/430,412; 11/839,693; 11/971,491; and 12/206,230 describe relevant processes (although the description of the present invention in some cases is based on different processing conditions than those described in the cited U.S. Patents).

In a typical cryogenic expansion recovery process, a feed gas stream under pressure is cooled by heat exchange with other streams of the process and/or external sources of refrigeration such as a propane compression-refrigeration system. As the gas is cooled, liquids may be condensed and collected in one or more separators as high-pressure liquids containing some of the desired $C_2$+ components. Depending on the richness of the gas and the amount of liquids formed, the high-pressure liquids may be expanded to a lower pressure and fractionated. The vaporization occurring during expansion of the liquids results in further cooling of the stream. Under some conditions, pre-cooling the high pressure liquids prior to the expansion may be desirable in order to further lower the temperature resulting from the expansion. The expanded stream, comprising a mixture of liquid and vapor, is fractionated in a distillation (demethanizer or deethanizer) column. In the column, the expansion cooled stream(s) is (are) distilled to separate residual methane, nitrogen, and other volatile gases as overhead vapor from the desired $C_2$ components, $C_3$ components, and heavier hydrocarbon components as bottom liquid product, or to separate residual methane, $C_2$ components, nitrogen, and other volatile gases as overhead vapor from the desired $C_3$ components and heavier hydrocarbon components as bottom liquid product.

If the feed gas is not totally condensed (typically it is not), the vapor remaining from the partial condensation can be split into two streams. One portion of the vapor is passed through a work expansion machine or engine, or an expansion valve, to a lower pressure at which additional liquids are condensed as a result of further cooling of the stream. The pressure after expansion is essentially the same as the pressure at which the distillation column is operated. The combined vapor-liquid phases resulting from the expansion are supplied as feed to the column.

The remaining portion of the vapor is cooled to substantial condensation by heat exchange with other process streams, e.g., the cold fractionation tower overhead. Some or all of the high-pressure liquid may be combined with this vapor portion prior to cooling. The resulting cooled stream is then expanded through an appropriate expansion device, such as an expansion valve, to the pressure at which the demethanizer is operated. During expansion, a portion of the liquid will vaporize, resulting in cooling of the total stream. The flash expanded stream is then supplied as top feed to the demethanizer. Typically, the vapor portion of the flash expanded stream and the demethanizer overhead vapor combine in an upper separator section in the fractionation tower as residual methane product gas. Alternatively, the cooled and expanded stream may be supplied to a separator to provide vapor and liquid streams. The vapor is combined with the tower overhead and the liquid is supplied to the column as a top column feed.

In the ideal operation of such a separation process, the residue gas leaving the process will contain substantially all of the methane in the feed gas with essentially none of the heavier hydrocarbon components and the bottoms fraction leaving the demethanizer will contain substantially all of the heavier hydrocarbon components with essentially no methane or more volatile components. In practice, however, this ideal situation is not obtained because the conventional demethanizer is operated largely as a stripping column. The methane product of the process, therefore, typically comprises vapors leaving the top fractionation stage of the column, together with vapors not subjected to any rectification step. Considerable losses of $C_2$, $C_3$, and $C_4$+ components occur because the top liquid feed contains substantial quantities of these components and heavier hydrocarbon components, resulting in corresponding equilibrium quantities of $C_2$ components, $C_3$ components, $C_4$ components, and heavier hydrocarbon components in the vapors leaving the top fractionation stage of the demethanizer. The loss of these desirable components could be significantly reduced if the rising vapors could be brought into contact with a significant quantity of liquid (reflux) capable of absorbing the $C_2$ components, $C_3$ components, $C_4$ components, and heavier hydrocarbon components from the vapors.

In recent years, the preferred processes for hydrocarbon separation use an upper absorber section to provide additional rectification of the rising vapors. One method of generating a reflux stream for the upper rectification section is to use the flash expanded substantially condensed stream to cool and partially condense the column overhead vapor, with the heated flash expanded stream then directed to a mid-column feed point on the demethanizer. The liquid condensed from the column overhead vapor is separated and supplied as top feed to the demethanizer, while the uncondensed vapor is discharged as the residual methane product gas. The heated flash expanded stream is only partially vaporized, and so contains a substantial quantity of liquid that serves as supplemental reflux for the demethanizer, so that the top reflux feed can then rectify the vapors leaving the lower section of the column. U.S. Pat. No. 4,854,955 is an example of a process of this type.

The present invention employs a novel means of performing the various steps described above more efficiently and using fewer pieces of equipment. This is accomplished by combining what heretofore have been individual equipment items into a common housing, thereby reducing the plot space required for the processing plant and reducing the capital cost of the facility. Surprisingly, applicants have found that the more compact arrangement also significantly reduces the power consumption required to achieve a given recovery level, thereby increasing the process efficiency and reducing the operating cost of the facility. In addition, the more compact arrangement also eliminates much of the piping used to interconnect the individual equipment items in traditional plant designs, further reducing capital cost and also eliminating the associated flanged piping connections. Since piping flanges are a potential leak source for hydrocarbons (which are volatile organic compounds, VOCs, that contribute to greenhouse gases and may also be precursors to atmospheric ozone formation), eliminating these flanges reduces the potential for atmospheric emissions that can damage the environment.

In accordance with the present invention, it has been found that $C_2$ recoveries in excess of 86% can be obtained. Similarly, in those instances where recovery of $C_2$ components is not desired, $C_3$ recoveries in excess of 99% can be obtained while providing essentially complete rejection of $C_2$ components to the residue gas stream. In addition, the present invention makes possible essentially 100% separation of methane (or $C_2$ components) and lighter components from the $C_2$ components (or $C_3$ components) and heavier components at lower energy requirements compared to the prior art while maintaining the same recovery level. The present invention, although applicable at lower pressures and warmer temperatures, is particularly advantageous when processing feed gases in the range of 400 to 1500 psia [2,758 to 10,342 kPa(a)] or higher under conditions requiring NGL recovery column overhead temperatures of −50° F. [−46° C.] or colder.

Figure 2:
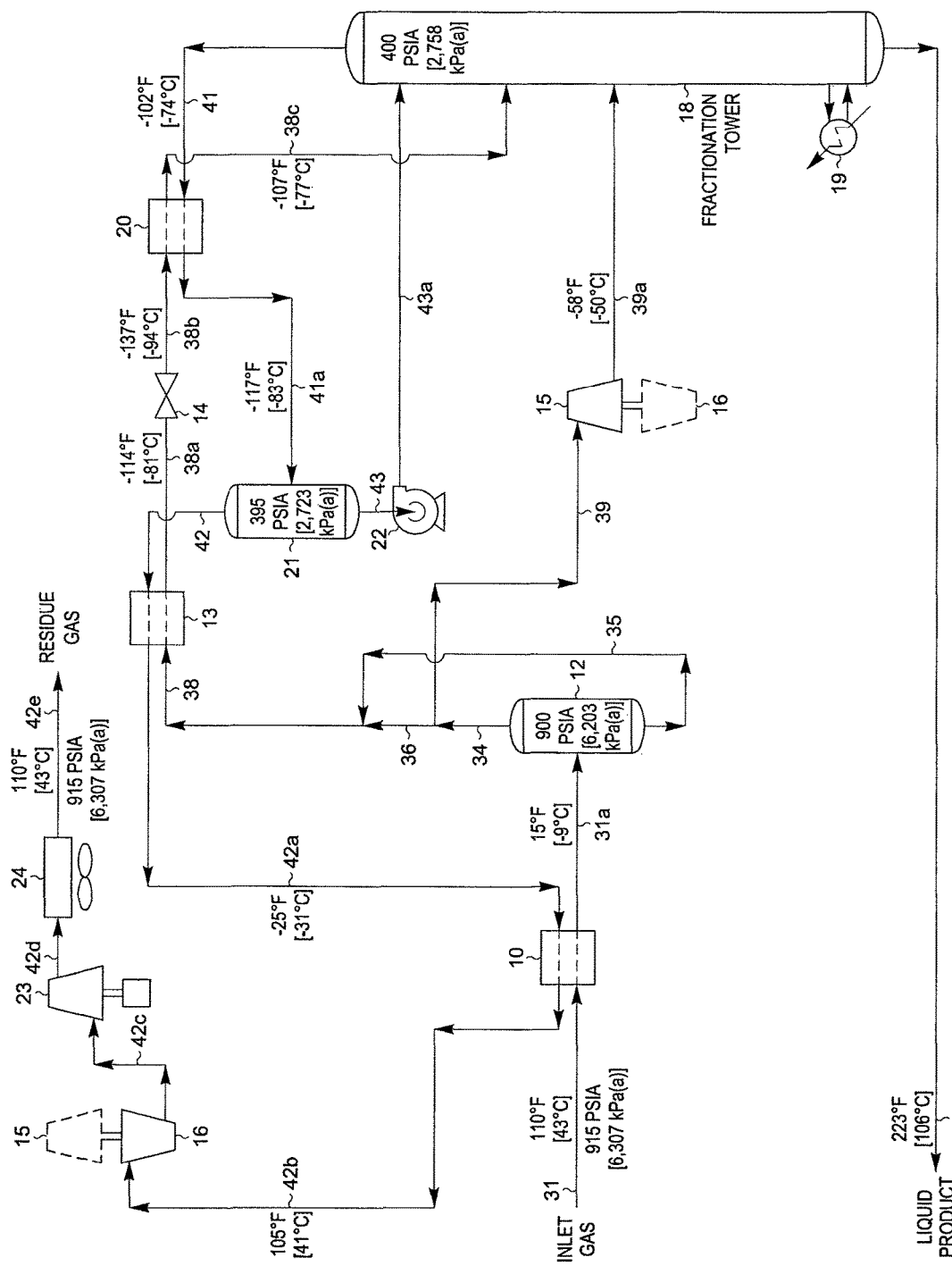
Figure 3:
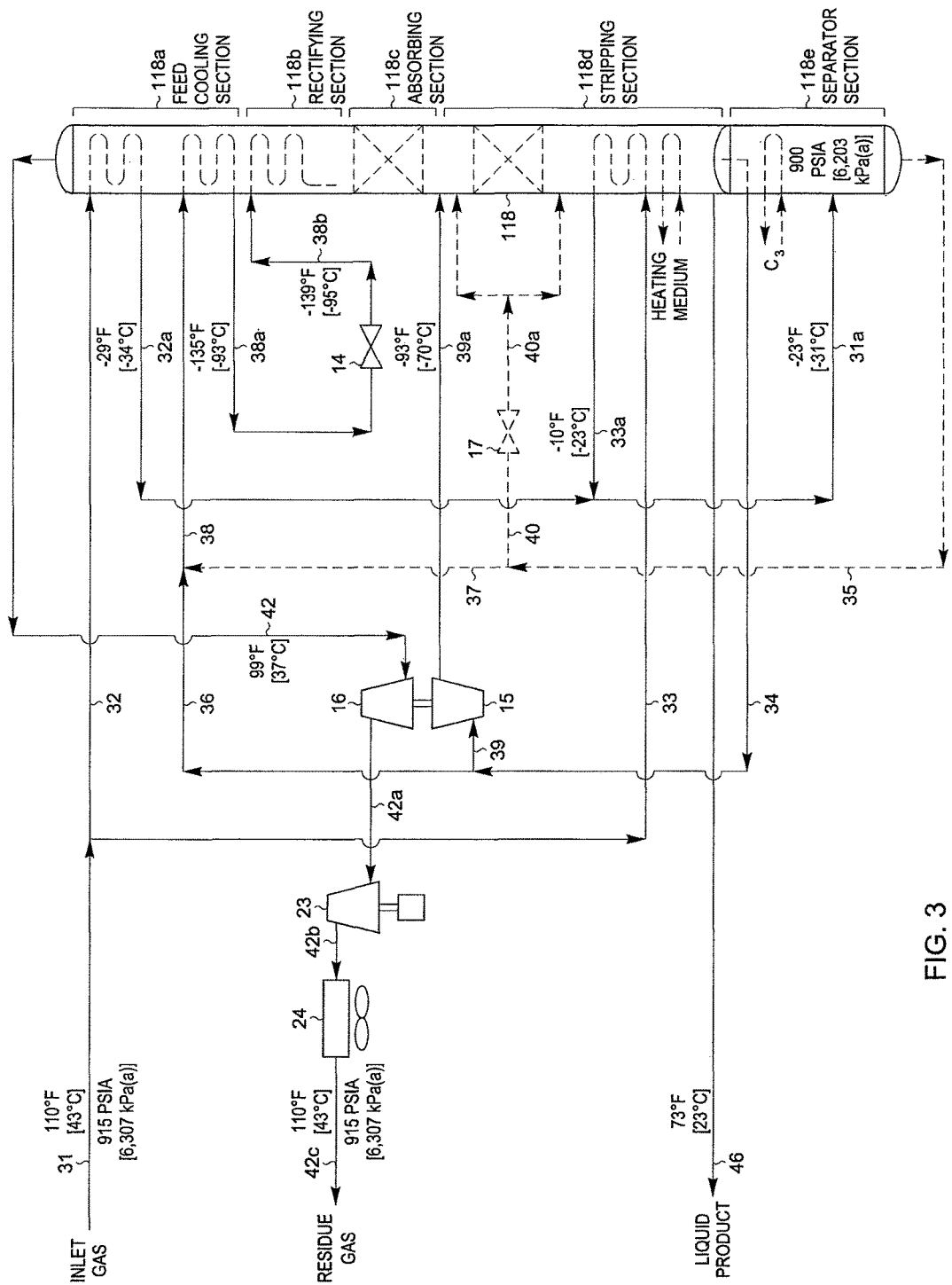
Figure 4:
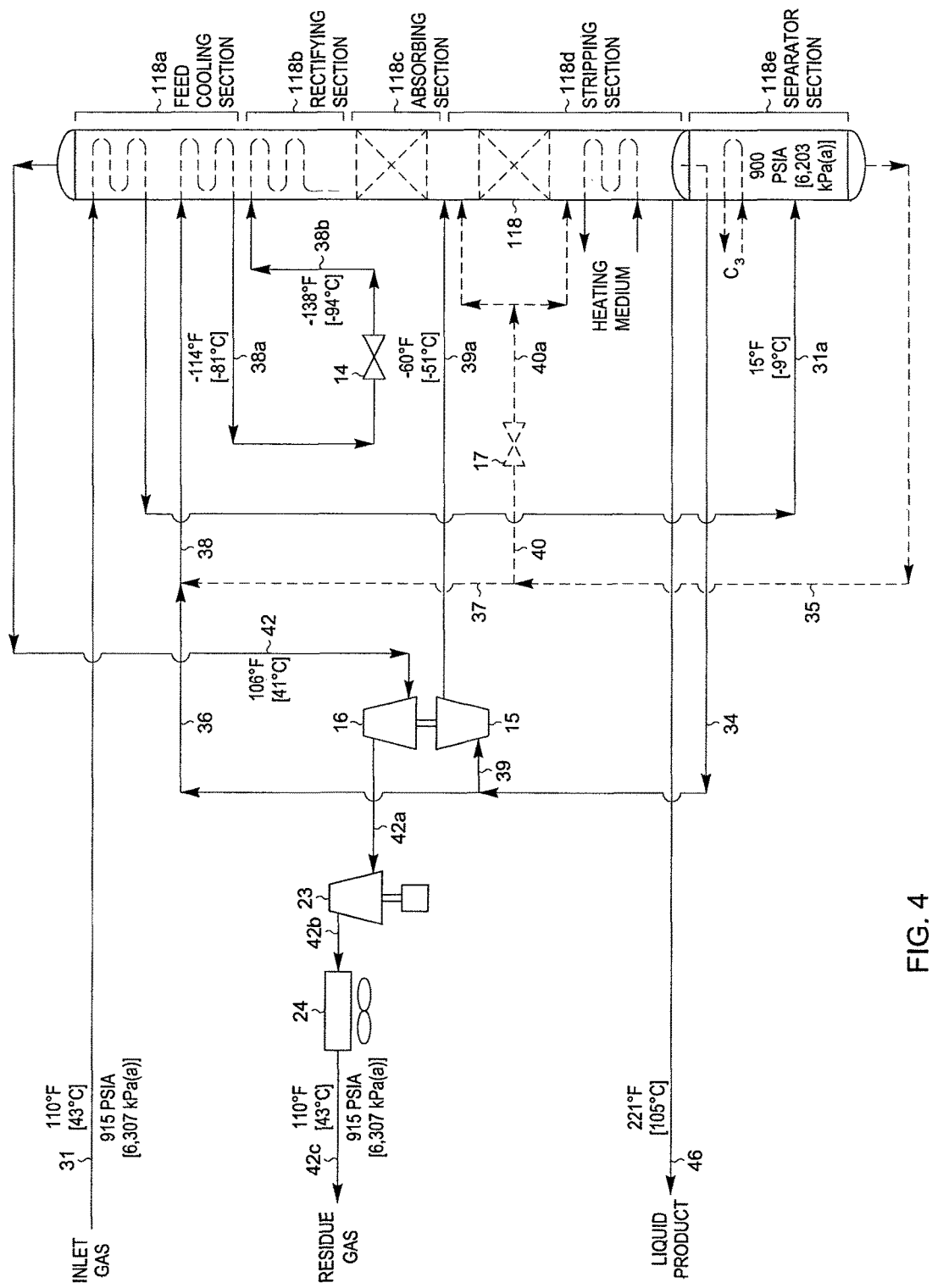
Figure 5:
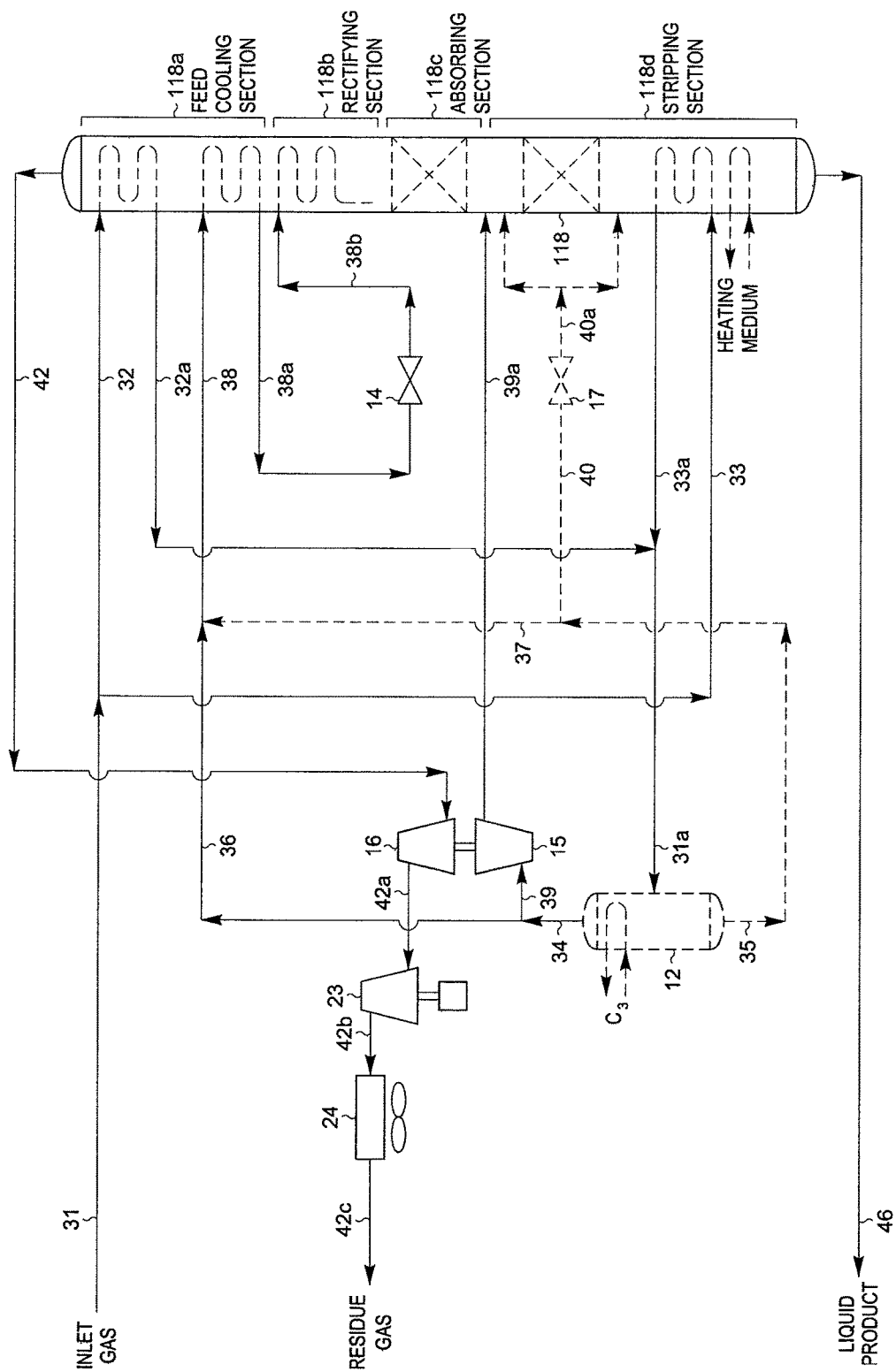
Figure 6:
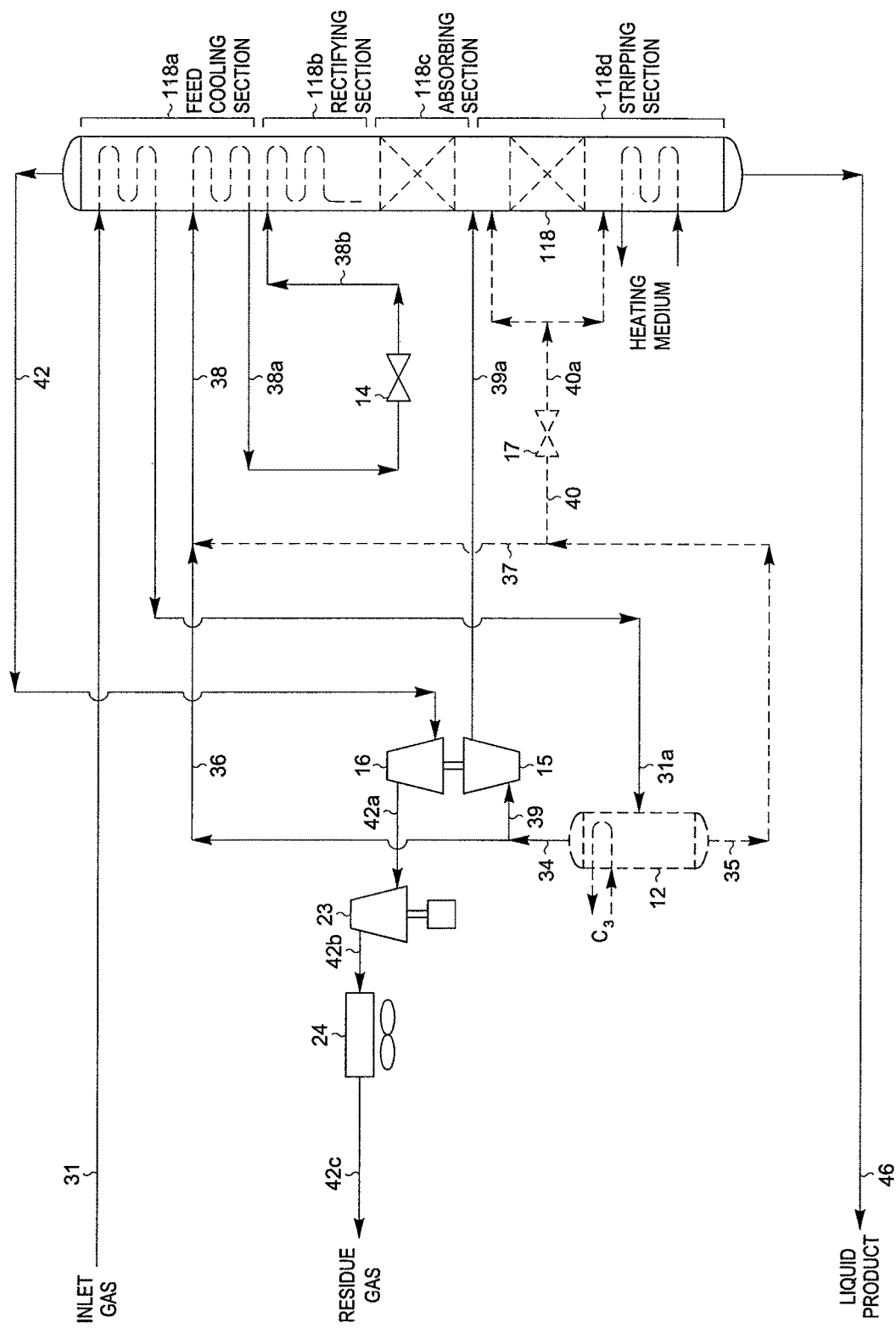

For a better understanding of the present invention, reference is made to the following examples and drawings. Referring to the drawings:

FIGS. 1 and 2 are flow diagrams of prior art natural gas processing plants in accordance with U.S. Pat. No. 4,854,955;

FIG. 3 is a flow diagram of a natural gas processing plant in accordance with the present invention; and FIGS. 4 through 6 are flow diagrams illustrating alternative means of application of the present invention to a natural gas stream.

In the following explanation of the above figures, tables are provided summarizing flow rates calculated for representative process conditions. In the tables appearing herein, the values for flow rates (in moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

For convenience, process parameters are reported in both the traditional British units and in the units of the Système International d'Unités (SI). The molar flow rates given in the tables may be interpreted as either pound moles per hour or kilogram moles per hour. The energy consumptions reported as horsepower (HP) and/or thousand British Thermal Units per hour (MBTU/Hr) correspond to the stated molar flow rates in pound moles per hour. The energy consumptions reported as kilowatts (kW) correspond to the stated molar flow rates in kilogram moles per hour.

DESCRIPTION OF THE PRIOR ART

FIG. 1 is a process flow diagram showing the design of a processing plant to recover $C_2$+ components from natural gas using prior art according to U.S. Pat. No. 4,854,955. In this simulation of the process, inlet gas enters the plant at 110° F. [43° C.] and 915 psia [6,307 kPa(a)] as stream 31. If the inlet gas contains a concentration of sulfur compounds which would prevent the product streams from meeting specifications, the sulfur compounds are removed by appropriate pretreatment of the feed gas (not illustrated). In addition, the feed stream is usually dehydrated to prevent hydrate (ice) formation under cryogenic conditions. Solid desiccant has typically been used for this purpose.

The feed stream 31 is divided into two portions, streams 32 and 33. Stream 32 is cooled to −34° F. [−37° C.] in heat exchanger 10 by heat exchange with cool residue gas stream 42a, while stream 33 is cooled to −13° F. [−25° C.] in heat exchanger 11 by heat exchange with demethanizer reboiler liquids at 52° F. [11° C.] (stream 45) and side reboiler liquids at −49° F. [−45° C.] (stream 44). Streams 32a and 33a recombine to form stream 31a, which enters separator 12 at −28° F. [−33° C.] and 893 psia [6,155 kPa(a)] where the vapor (stream 34) is separated from the condensed liquid (stream 35).

The vapor (stream 34) from separator 12 is divided into two streams, 36 and 39. Stream 36, containing about 27% of the total vapor, is combined with the separator liquid (stream 35), and the combined stream 38 passes through heat exchanger 13 in heat exchange relation with cold residue gas stream 42 where it is cooled to substantial condensation. The resulting substantially condensed stream 38a at −135° F. [−93° C.] is then flash expanded through expansion valve 14 to slightly above the operating pressure (approximately 396 psia [2,730 kPa(a)]) of fractionation tower 18. During expansion a portion of the stream is vaporized, resulting in cooling of the total stream. In the process illustrated in FIG. 1, the expanded stream 38b leaving expansion valve 14 reaches a temperature of −138° F. [−94° C.] before entering heat exchanger 20. In heat exchanger 20, the flash expanded stream is heated and partially vaporized as it provides cooling and partial condensation of column overhead stream 41, with the heated stream 38c at −139° F. [−95° C.] thereafter supplied to fractionation tower 18 at an upper mid-column feed point. (Note that the temperature of stream 38b/38c drops slightly as it is heated, due to the pressure drop through heat exchanger 20 and the resulting vaporization of some of the liquid methane contained in the stream.)

The remaining 73% of the vapor from separator 12 (stream 39) enters a work expansion machine 15 in which mechanical energy is extracted from this portion of the high pressure feed. The machine 15 expands the vapor substantially isentropically to the tower operating pressure, with the work expansion cooling the expanded stream 39a to a temperature of approximately −95° F. [−71° C.]. The typical commercially available expanders are capable of recovering on the order of 80-85% of the work theoretically available in an ideal isentropic expansion. The work recovered is often used to drive a centrifugal compressor (such as item 16) that can be used to re-compress the heated residue gas stream (stream 42b), for example. The partially condensed expanded stream 39a is thereafter supplied as feed to fractionation tower 18 at a lower mid-column feed point.

The column overhead vapor (stream 41) is withdrawn from the top of demethanizer 18 and cooled from −136° F. [−93° C.] to −138° F. [−94° C.] and partially condensed (stream 41a) in heat exchanger 20 by heat exchange with the flash expanded substantially condensed stream 38b as previously described. The operating pressure in reflux separator 21 (391 psia [2,696 kPa(a)]) is maintained slightly below the operating pressure of demethanizer 18. This provides the driving force which causes overhead vapor stream 41 to flow through heat exchanger 20 and thence into the reflux separator 21 wherein the condensed liquid (stream 43) is separated from the uncondensed vapor (stream 42). The liquid stream 43 from reflux separator 21 is pumped by pump 22 to a pressure slightly above the operating pressure of demethanizer 18, and stream 43a is then supplied as cold top column feed (reflux) to demethanizer 18. This cold liquid reflux absorbs and condenses the $C_2$ components, $C_3$ components, and heavier components in the vapors rising through the upper region of absorbing section 18a of demethanizer 18.

The demethanizer in tower 18 is a conventional distillation column containing a plurality of vertically spaced trays, one or more packed beds, or some combination of trays and packing. As is often the case in natural gas processing plants, the demethanizer tower consists of two sections: an upper absorbing (rectification) section 18a that contains the trays and/or packing to provide the necessary contact between the vapor portion of expanded stream 39a rising upward and cold liquid falling downward to condense and absorb the $C_2$ components, $C_3$ components, and heavier components; and a lower stripping (demethanizing) section 18b that contains the trays and/or packing to provide the necessary contact between the liquids falling downward and the vapors rising upward. The demethanizing section 18b also includes reboilers (such as the reboiler and the side reboiler described previously) which heat and vaporize a portion of the liquids flowing down the column to provide the stripping vapors which flow up the column to strip the liquid product (stream 46) of methane and lighter components. The liquid product stream 46 exits the bottom of the tower at 77° F. [25° C.], based on a typical specification of a methane to ethane ratio of 0.010:1 on a mass basis in the bottom product.

Vapor stream 42 from reflux separator 21 is the cold residue gas stream. It passes countercurrently to the incoming feed gas in heat exchanger 13 where it is heated to −54° F. [−48° C.] (stream 42a) and in heat exchanger 10 where it is heated to 98° F. [37° C.] (stream 42b) as it provides cooling as previously described. The residue gas is then re-compressed in two stages. The first stage is compressor 16 driven by expansion machine 15. The second stage is compressor 23 driven by a supplemental power source which compresses the residue gas (stream 42d) to sales line pressure. After cooling to 110° F. [43° C.] in discharge cooler 24, residue gas stream 42e flows to the sales gas pipeline at 915 psia [6,307 kPa(a)], sufficient to meet line requirements (usually on the order of the inlet pressure).

A summary of stream flow rates and energy consumption for the process illustrated in FIG. 1 is set forth in the following table:

TABLE I (FIG. 1)
Stream Flow Summary - Lb. Moles/Hr [kg moles/Hr]

| Stream | Methane | Ethane | Propane | Butanes+ | Total |
|---|---|---|---|---|---|
| 31 | 12,398 | 546 | 233 | 229 | 13,726 |
| 32 | 8,431 | 371 | 159 | 156 | 9,334 |
| 33 | 3,967 | 175 | 74 | 73 | 4,392 |
| 34 | 12,195 | 501 | 179 | 77 | 13,261 |
| 35 | 203 | 45 | 54 | 152 | 465 |
| 36 | 3,317 | 136 | 49 | 21 | 3,607 |
| 38 | 3,520 | 181 | 103 | 173 | 4,072 |
| 39 | 8,878 | 365 | 130 | 56 | 9,654 |
| 41 | 12,449 | 86 | 7 | 1 | 12,788 |
| 43 | 60 | 4 | 2 | 1 | 69 |
| 42 | 12,389 | 82 | 5 | 0 | 12,719 |
| 46 | 9 | 464 | 228 | 229 | 1,007 |

| Recoveries* | |
|---|---|
| Ethane | 84.99% |
| Propane | 97.74% |
| Butanes+ | 99.83% |

| Power | | |
|---|---|---|
| Residue Gas Compression | 5,505 HP | [9,050 kW] |

*(Based on un-rounded flow rates)

FIG. 2 is a process flow diagram showing one manner in which the design of the processing plant in FIG. 1 can be adapted to operate at a lower $C_2$ component recovery level.

This is a common requirement when the relative values of natural gas and liquid hydrocarbons are variable, causing recovery of the $C_2$ components to be unprofitable at times. The process of FIG. 2 has been applied to the same feed gas composition and conditions as described previously for FIG. 1. However, in the simulation of the process of FIG. 2, the process operating conditions have been adjusted to reject nearly all of $C_2$ components to the residue gas rather than recovering them in the bottom liquid product from the fractionation tower.

In this simulation of the process, inlet gas enters the plant at 110° F. [43° C.] and 915 psia [6,307 kPa(a)] as stream 31 and is cooled in heat exchanger 10 by heat exchange with cool residue gas stream 42a. Cooled stream 31a enters separator 12 at 15° F. [−9° C.] and 900 psia [6,203 kPa(a)] where the vapor (stream 34) is separated from the condensed liquid (stream 35).

The vapor (stream 34) from separator 12 is divided into two streams, 36 and 39. Stream 36, containing about 28% of the total vapor, is combined with the separator liquid (stream 35), and the combined stream 38 passes through heat exchanger 13 in heat exchange relation with cold residue gas stream 42 where it is cooled to substantial condensation. The resulting substantially condensed stream 38a at −114° F. [−81° C.] is then flash expanded through expansion valve 14 to slightly above the operating pressure (approximately 400 psia [2,758 kPa(a)]) of fractionation tower 18. During expansion a portion of the stream is vaporized, resulting in cooling of the total stream. In the process illustrated in FIG. 2, the expanded stream 38b leaving expansion valve 14 reaches a temperature of −137° F. [−94° C.] before entering heat exchanger 20. In heat exchanger 20, the flash expanded stream is heated and partially vaporized as it provides cooling and partial condensation of column overhead stream 41, with the heated stream 38c at −107° F. [−77° C.] thereafter supplied to fractionation tower 18 at an upper mid-column feed point.

The remaining 72% of the vapor from separator 12 (stream 39) enters a work expansion machine 15 in which mechanical energy is extracted from this portion of the high pressure feed. The machine 15 expands the vapor substantially isentropically to the tower operating pressure, with the work expansion cooling the expanded stream 39a to a temperature of approximately −58° F. [−50° C.] before it is supplied as feed to fractionation tower 18 at a lower mid-column feed point.

The column overhead vapor (stream 41) is withdrawn from the top of deethanizer 18 and cooled from −102° F. [−74° C.] to −117° F. [−83° C.] and partially condensed (stream 41a) in heat exchanger 20 by heat exchange with the flash expanded substantially condensed stream 38b as previously described. The partially condensed stream 41a enters reflux separator 21, operating at 395 psia [2,723 kPa(a)], where the condensed liquid (stream 43) is separated from the uncondensed vapor (stream 42). The liquid stream 43 from reflux separator 21 is pumped by pump 22 to a pressure slightly above the operating pressure of deethanizer 18, and stream 43a is then supplied as cold top column feed (reflux) to deethanizer 18.

The liquid product stream 46 exits the bottom of the tower at 223° F. [106° C.], based on a typical specification of an ethane to propane ratio of 0.050:1 on a molar basis in the bottom product. The cold residue gas (vapor stream 42 from reflux separator 21) passes countercurrently to the incoming feed gas in heat exchanger 13 where it is heated to −25° F. [−31° C.] (stream 42a) and in heat exchanger 10 where it is heated to 105° F. [41° C.] (stream 42b) as it provides cooling as previously described. The residue gas is then re-compressed in two stages, compressor 16 driven by expansion machine 15 and compressor 23 driven by a supplemental power source. After stream 42d is cooled to 110° F. [43° C.] in discharge cooler 24, the residue gas product (stream 42e) flows to the sales gas pipeline at 915 psia [6,307 kPa(a)].

A summary of stream flow rates and energy consumption for the process illustrated in FIG. 2 is set forth in the following table:

TABLE II (FIG. 2)
Stream Flow Summary - Lb. Moles/Hr [kg moles/Hr]

| Stream | Methane | Ethane | Propane | Butanes+ | Total |
|---|---|---|---|---|---|
| 31 | 12,398 | 546 | 233 | 229 | 13,726 |
| 34 | 12,332 | 532 | 215 | 128 | 13,523 |
| 35 | 66 | 14 | 18 | 101 | 203 |
| 36 | 3,502 | 151 | 61 | 36 | 3,841 |
| 38 | 3,568 | 165 | 79 | 137 | 4,044 |
| 39 | 8,830 | 381 | 154 | 92 | 9,682 |
| 41 | 13,441 | 1,033 | 7 | 0 | 14,877 |
| 43 | 1,043 | 498 | 6 | 0 | 1,624 |
| 42 | 12,398 | 535 | 1 | 0 | 13,253 |
| 46 | 0 | 11 | 232 | 229 | 473 |

Recoveries*

| | |
|---|---|
| Propane | 99.50% |
| Butanes+ | 100.00% |

Power

| | | |
|---|---|---|
| Residue Gas Compression | 5,595 HP | [9,198 kW] |

*(Based on un-rounded flow rates)

DESCRIPTION OF THE INVENTION

Example 1

FIG. 3 illustrates a flow diagram of a process in accordance with the present invention. The feed gas composition and conditions considered in the process presented in FIG. 3 are the same as those in FIG. 1. Accordingly, the FIG. 3 process can be compared with that of the FIG. 1 process to illustrate the advantages of the present invention.

In the simulation of the FIG. 3 process, inlet gas enters the plant as stream 31 and is divided into two portions, streams 32 and 33. The first portion, stream 32, enters a heat exchange means in the upper region of feed cooling section 118a inside processing assembly 118. This heat exchange means may be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 32 flowing through one pass of the heat exchange means and a distillation vapor stream arising from rectifying section 118b inside processing assembly 118 that has been heated in a heat exchange means in the lower region of feed cooling section 118a. Stream 32 is cooled while further heating the distillation vapor stream, with stream 32a leaving the heat exchange means at −29° F. [−34° C.].

The second portion, stream 33, enters a heat and mass transfer means in stripping section 118d inside processing assembly 118. This heat and mass transfer means may also be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between stream 33 flowing through one pass of the heat and mass transfer means and a distillation liquid stream flowing downward from an absorbing means above the heat and mass transfer means in stripping section 118d, so that stream 33 is cooled while heating the distillation liquid stream, cooling stream 33a to −10° F. [−23° C.] before it leaves the heat and mass transfer means. As the distillation liquid stream is heated, a portion of it is vaporized to form stripping vapors that rise upward as the remaining liquid continues flowing downward through the heat and mass transfer means. The heat and mass transfer means provides continuous contact between the stripping vapors and the distillation liquid stream so that it also functions to provide mass transfer between the vapor and liquid phases, stripping the liquid product stream 46 of methane and lighter components.

Streams 32a and 33a recombine to form stream 31a, which enters separator section 118e inside processing assembly 118 at −23° F. [−31° C.] and 900 psia [6,203 kPa(a)], whereupon the vapor (stream 34) is separated from the condensed liquid (stream 35). Separator section 118e has an internal head or other means to divide it from stripping section 118d, so that the two sections inside processing assembly 118 can operate at different pressures.

The vapor (stream 34) from separator section 118e is divided into two streams, 36 and 39. Stream 36, containing about 29% of the total vapor, is combined with the separated liquid (stream 35, via stream 37), and the combined stream 38 enters a heat exchange means in the lower region of feed cooling section 118a inside processing assembly 118. This heat exchange means may likewise be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 38 flowing through one pass of the heat exchange means and the distillation vapor stream arising from rectifying section 118b inside processing assembly 118, so that stream 38 is cooled to substantial condensation while heating the distillation vapor stream.

The resulting substantially condensed stream 38a at −135° F. [−93° C.] is then flash expanded through expansion valve 14 to slightly above the operating pressure (approximately 388 psia [2,675 kPa(a)]) of rectifying section 118b and absorbing section 118c (an absorbing means) inside processing assembly 118. During expansion a portion of the stream may be vaporized, resulting in cooling of the total stream. In the process illustrated in FIG. 3, the expanded stream 38b leaving expansion valve 14 reaches a temperature of −139° F. [−95° C.] before it is directed into a heat and mass transfer means inside rectifying section 118b. This heat and mass transfer means may also be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between the distillation vapor stream arising from absorbing section 118c flowing upward through one pass of the heat and mass transfer means and the expanded stream 38b flowing downward, so that the distillation vapor is cooled while heating the expanded stream. As the distillation vapor stream is cooled, a portion of it is condensed and falls downward while the remaining distillation vapor continues flowing upward through the heat and mass transfer means. The heat and mass transfer means provides continuous contact between the condensed liquid and the distillation vapor so that it also functions to provide mass transfer between the vapor and liquid phases, thereby providing rectification of the distillation vapor. The condensed liquid is collected from the bottom of the heat and mass transfer means and directed to absorbing section 118c.

The flash expanded stream 38b is partially vaporized as it provides cooling and partial condensation of the distillation vapor stream, and exits the heat and mass transfer means in rectifying section 118b at −140° F. [−96° C.]. (Note that the temperature of stream 38b drops slightly as it is heated, due to the pressure drop through the heat and mass transfer means and the resulting vaporization of some of the liquid methane contained in the stream.) The heated flash expanded stream is separated into its respective vapor and liquid phases, with the vapor phase combining with the vapor arising from absorbing section 118c to form the distillation vapor stream that enters the heat and mass transfer means in rectifying section 118b as previously described. The liquid phase is directed to the upper region of absorbing section 118c to join with the liquid condensed from the distillation vapor stream in rectifying section 118b.

The remaining 71% of the vapor from separator section 118e (stream 39) enters a work expansion machine 15 in which mechanical energy is extracted from this portion of the high pressure feed. The machine 15 expands the vapor substantially isentropically to the operating pressure of absorbing section 118c, with the work expansion cooling the expanded stream 39a to a temperature of approximately −93° F. [−70° C.]. The partially condensed expanded stream 39a is thereafter supplied as feed to the lower region of absorbing section 118c inside processing assembly 118 to be contacted by the liquids supplied to the upper region of absorbing section 118c.

Absorbing section 118c and stripping section 118d each contain an absorbing means consisting of a plurality of vertically spaced trays, one or more packed beds, or some combination of trays and packing. The trays and/or packing in absorbing section 118c and stripping section 118d provide the necessary contact between the vapors rising upward and cold liquid falling downward. The liquid portion of the expanded stream 39a commingles with liquids falling downward from absorbing section 118c and the combined liquid continues downward into stripping section 118d. The vapors arising from stripping section 118d combine with the vapor portion of the expanded stream 39a and rise upward through absorbing section 118c, to be contacted with the cold liquid falling downward to condense and absorb most of the $C_2$ components, $C_3$ components, and heavier components from these vapors. The vapors arising from absorbing section 118c combine with the vapor portion of the heated expanded stream 38b and rise upward through rectifying section 118b, to be cooled and rectified to remove most of the $C_2$ components, $C_3$ components, and heavier components remaining in these vapors as previously described. The liquid portion of the heated expanded stream 38b commingles with liquids falling downward from rectifying section 118b and the combined liquid continues downward into absorbing section 118c.

The distillation liquid flowing downward from the heat and mass transfer means in stripping section 118d inside processing assembly 118 has been stripped of methane and lighter components. The resulting liquid product (stream 46)

exits the lower region of stripping section 118d and leaves processing assembly 118 at 73° F. [23° C.]. The distillation vapor stream arising from rectifying section 118b is warmed in feed cooling section 118a as it provides cooling to streams 32 and 38 as previously described, and the resulting residue gas stream 42 leaves processing assembly 118 at 99° F. [37° C.]. The residue gas stream is then re-compressed in two stages, compressor 16 driven by expansion machine 15 and compressor 23 driven by a supplemental power source. After stream 42b is cooled to 110° F. [43° C.] in discharge cooler 24, the residue gas product (stream 42c) flows to the sales gas pipeline at 915 psia [6,307 kPa(a)].

A summary of stream flow rates and energy consumption for the process illustrated in FIG. 3 is set forth in the following table:

TABLE III (FIG. 3)
Stream Flow Summary - Lb. Moles/Hr [kg moles/Hr]

| Stream | Methane | Ethane | Propane | Butanes+ | Total |
|---|---|---|---|---|---|
| 31 | 12,398 | 546 | 233 | 229 | 13,726 |
| 32 | 8,431 | 371 | 159 | 156 | 9,334 |
| 33 | 3,967 | 175 | 74 | 73 | 4,392 |
| 34 | 12,221 | 507 | 186 | 83 | 13,308 |
| 35 | 177 | 39 | 47 | 146 | 418 |
| 36 | 3,544 | 147 | 54 | 24 | 3,859 |
| 37 | 177 | 39 | 47 | 146 | 418 |
| 38 | 3,721 | 186 | 101 | 170 | 4,277 |
| 39 | 8,677 | 360 | 132 | 59 | 9,449 |
| 42 | 12,389 | 73 | 5 | 0 | 12,700 |
| 46 | 9 | 473 | 228 | 229 | 1,026 |

Recoveries*

| | |
|---|---|
| Ethane | 86.66% |
| Propane | 98.01% |
| Butanes+ | 99.81% |

Power

| | | |
|---|---|---|
| Residue Gas Compression | 5,299 HP | [8,711 kW] |

*(Based on un-rounded flow rates)

A comparison of Tables I and III shows that, compared to the prior art, the present invention improves ethane recovery from 84.99% to 86.66% and propane recovery from 97.74% to 98.01%, and maintains essentially the same butanes+ recovery (99.81% versus 99.83% for the prior art). Comparison of Tables I and III further shows that the product yields were achieved using significantly less power than the prior art. In terms of the recovery efficiency (defined by the quantity of ethane recovered per unit of power), the present invention represents nearly a 6% improvement over the prior art of the FIG. 1 process.

The improvement in recovery efficiency provided by the present invention over that of the prior art of the FIG. 1 process is primarily due to three factors. First, the compact arrangement of the heat exchange means in feed cooling section 118a and rectifying section 118b inside processing assembly 118 eliminates the pressure drop imposed by the interconnecting piping found in conventional processing plants. The result is that the residue gas flowing to compressor 16 is at higher pressure for the present invention compared to the prior art, so that the residue gas entering compressor 23 is at significantly higher pressure, thereby reducing the power required by the present invention to restore the residue gas to pipeline pressure.

Second, using the heat and mass transfer means in stripping section 118d to simultaneously heat the distillation liquid leaving the absorbing means in stripping section 118d while allowing the resulting vapors to contact the liquid and strip its volatile components is more efficient than using a conventional distillation column with external reboilers. The volatile components are stripped out of the liquid continuously, reducing the concentration of the volatile components in the stripping vapors more quickly and thereby improving the stripping efficiency for the present invention.

Third, using the heat and mass transfer means in rectifying section 118b to simultaneously cool the distillation vapor stream arising from absorbing section 118c while condensing the heavier hydrocarbon components from the distillation vapor stream provides more efficient rectification than using reflux in a conventional distillation column. As a result, more of the $C_2$ components, $C_3$ components, and heavier hydrocarbon components can be removed from the distillation vapor stream using the refrigeration available in the expanded stream 38b compared to the prior art of the FIG. 1 process.

The present invention offers two other advantages over the prior art in addition to the increase in processing efficiency. First, the compact arrangement of processing assembly 118 of the present invention replaces eight separate equipment items in the prior art (heat exchangers 10, 11, 13, and 20, separator 12, reflux separator 21, reflux pump 22, and fractionation tower 18 in FIG. 1) with a single equipment item (processing assembly 118 in FIG. 3). This reduces the plot space requirements, eliminates the interconnecting piping, and eliminates the power consumed by the reflux pump, reducing the capital cost and operating cost of a process plant utilizing the present invention over that of the prior art. Second, elimination of the interconnecting piping means that a processing plant utilizing the present invention has far fewer flanged connections compared to the prior art, reducing the number of potential leak sources in the plant. Hydrocarbons are volatile organic compounds (VOCs), some of which are classified as greenhouse gases and some of which may be precursors to atmospheric ozone formation, which means the present invention reduces the potential for atmospheric releases that can damage the environment.

Example 2

In those cases where the $C_2$ component recovery level in the liquid product must be reduced (as in the FIG. 2 prior art process described previously, for instance), the present invention offers significant efficiency advantages over the prior art process depicted in FIG. 2. The operating conditions of the FIG. 3 process can be altered as illustrated in FIG. 4 to reduce the ethane content in the liquid product of the present invention to the same level as for the FIG. 2 prior art process. The feed gas composition and conditions considered in the process presented in FIG. 4 are the same as those in FIG. 2. Accordingly, the FIG. 4 process can be compared with that of the FIG. 2 process to further illustrate the advantages of the present invention.

In the simulation of the FIG. 4 process, inlet gas stream 31 enters a heat exchange means in the upper region of feed cooling section 118a inside processing assembly 118. The heat exchange means is configured to provide heat exchange between stream 31 flowing through one pass of the heat exchange means and a distillation vapor stream arising from rectifying section 118b inside processing assembly 118 that has been heated in a heat exchange means in the lower region of feed cooling section 118a. Stream 31 is cooled while further heating the distillation vapor stream, with stream 31a leaving the heat exchange means and thereafter entering separator section 118e inside processing assembly 118 at 15° F. [−9° C.] and 900 psia [6,203 kPa(a)], whereupon the vapor (stream 34) is separated from the condensed liquid (stream 35).

The vapor (stream 34) from separator section 118e is divided into two streams, 36 and 39. Stream 36, containing about 28% of the total vapor, is combined with the separated liquid (stream 35, via stream 37), and the combined stream 38 enters a heat exchange means in the lower region of feed cooling section 118a inside processing assembly 118. The heat exchange means is configured to provide heat exchange between stream 38 flowing through one pass of the heat exchange means and the distillation vapor stream arising from rectifying section 118b inside processing assembly 118, so that stream 38 is cooled to substantial condensation while heating the distillation vapor stream.

The resulting substantially condensed stream 38a at −114° F. [−81° C.] is then flash expanded through expansion valve 14 to slightly above the operating pressure (approximately 393 psia [2,710 kPa(a)]) of rectifying section 118b and absorbing section 118c inside processing assembly 118. During expansion a portion of the stream may be vaporized, resulting in cooling of the total stream. In the process illustrated in FIG. 4, the expanded stream 38b leaving expansion valve 14 reaches a temperature of −138° F. [−94° C.] before it is directed into a heat and mass transfer means inside rectifying section 118b. The heat and mass transfer means is configured to provide heat exchange between the distillation vapor stream arising from absorbing section 118c flowing upward through one pass of the heat and mass transfer means and the expanded stream 38b flowing downward, so that the distillation vapor is cooled while heating the expanded stream. As the distillation vapor stream is cooled, a portion of it is condensed and falls downward while the remaining distillation vapor continues flowing upward through the heat and mass transfer means. The heat and mass transfer means provides continuous contact between the condensed liquid and the distillation vapor so that it also functions to provide mass transfer between the vapor and liquid phases, thereby providing rectification of the distillation vapor. The condensed liquid is collected from the bottom of the heat and mass transfer means and directed to absorbing section 118c.

The flash expanded stream 38b is partially vaporized as it provides cooling and partial condensation of the distillation vapor stream, then exits the heat and mass transfer means in rectifying section 118b at −104° F. [−75° C.] and is separated into its respective vapor and liquid phases. The vapor phase combines with the vapor arising from absorbing section 118c to form the distillation vapor stream that enters the heat and mass transfer means in rectifying section 118b as previously described. The liquid phase is directed to the upper region of absorbing section 118c to join with the liquid condensed from the distillation vapor stream in rectifying section 118b.

The remaining 72% of the vapor from separator section 118e (stream 39) enters a work expansion machine 15 in which mechanical energy is extracted from this portion of the high pressure feed. The machine 15 expands the vapor substantially isentropically to the operating pressure of absorbing section 118c, with the work expansion cooling the expanded stream 39a to a temperature of approximately −60° F. [−51° C.]. The partially condensed expanded stream 39a is thereafter supplied as feed to the lower region of absorbing section 118c inside processing assembly 118 to be contacted by the liquids supplied to the upper region of absorbing section 118c.

Absorbing section 118c and stripping section 118d each contain an absorbing means. Stripping section 118d also includes a heat and mass transfer means beneath its absorbing means which is configured to provide heat exchange between a heating medium flowing through one pass of the heat and mass transfer means and a distillation liquid stream flowing downward from the absorbing means, so that the distillation liquid stream is heated. As the distillation liquid stream is heated, a portion of it is vaporized to form stripping vapors that rise upward as the remaining liquid continues flowing downward through the heat and mass transfer means. The heat and mass transfer means provides continuous contact between the stripping vapors and the distillation liquid stream so that it also functions to provide mass transfer between the vapor and liquid phases, stripping the liquid product stream 46 of methane, $C_2$ components, and lighter components. The resulting liquid product (stream 46) exits the lower region of stripping section 118d and leaves processing assembly 118 at 221° F. [105° C.].

The distillation vapor stream arising from rectifying section 118b is warmed in feed cooling section 118a as it provides cooling to streams 31 and 38 as previously described, and the resulting residue gas stream 42 leaves processing assembly 118 at 106° F. [41° C.]. The residue gas stream is then re-compressed in two stages, compressor 16 driven by expansion machine 15 and compressor 23 driven by a supplemental power source. After stream 42b is cooled to 110° F. [43° C.] in discharge cooler 24, the residue gas product (stream 42c) flows to the sales gas pipeline at 915 psia [6,307 kPa(a)].

A summary of stream flow rates and energy consumption for the process illustrated in FIG. 4 is set forth in the following table:

TABLE IV (FIG. 4)
Stream Flow Summary - Lb. Moles/Hr [kg moles/Hr]

| Stream | Methane | Ethane | Propane | Butanes+ | Total |
|---|---|---|---|---|---|
| 31 | 12,398 | 546 | 233 | 229 | 13,726 |
| 34 | 12,332 | 532 | 215 | 128 | 13,523 |
| 35 | 66 | 14 | 18 | 101 | 203 |
| 36 | 3,515 | 152 | 61 | 36 | 3,854 |
| 37 | 66 | 14 | 18 | 101 | 203 |
| 38 | 3,581 | 166 | 79 | 137 | 4,057 |
| 39 | 8,817 | 380 | 154 | 92 | 9,669 |
| 42 | 12,398 | 535 | 1 | 0 | 13,253 |
| 46 | 0 | 11 | 232 | 229 | 473 |

| Recoveries* | |
|---|---|
| Propane | 99.50% |
| Butanes+ | 100.00% |

| Power | |
|---|---|
| Residue Gas Compression | 5,384 HP [8,851 kW] |

*(Based on un-rounded flow rates)

A comparison of Tables II and IV shows that the present invention maintains essentially the same recoveries as the prior art. However, further comparison of Tables II and IV shows that the product yields were achieved using significantly less power than the prior art. In terms of the recovery efficiency (defined by the quantity of propane recovered per unit of power), the present invention represents nearly a 4% improvement over the prior art of the FIG. 2 process.

The FIG. 4 embodiment of the present invention provides the same advantages related to the compact arrangement of processing assembly 118 as the FIG. 3 embodiment. The FIG. 4 embodiment of the present invention replaces seven separate equipment items in the prior art (heat exchangers 10, 13, and 20, separator 12, reflux separator 21, reflux pump 22, and fractionation tower 18 in FIG. 2) with a single equipment item (processing assembly 118 in FIG. 4). This reduces the plot space requirements, eliminates the interconnecting piping, and eliminates the power consumed by the reflux pump, reducing the capital cost and operating cost of a process plant utilizing this embodiment of the present invention over that of the prior art, while also reducing the potential for atmospheric releases that can damage the environment.

Other Embodiments

Some circumstances may favor supplying liquid stream 35 directly to stripping section 118d via stream 40 as shown in FIGS. 3 through 6. In such cases, an appropriate expansion device (such as expansion valve 17) is used to expand the liquid to the operating pressure of stripping section 118d and the resulting expanded liquid stream 40a is supplied as feed to stripping section 118d above the absorbing means, above the heat and mass transfer means, or to both such feed points (as shown by the dashed lines). Some circumstances may favor combining a portion of liquid stream 35 (stream 37) with the vapor in stream 36 to form combined stream 38 and routing the remaining portion of liquid stream 35 to stripping section 118d via streams 40/40a. Some circumstances may favor combining the expanded liquid stream 40a with expanded stream 39a and thereafter supplying the combined stream to the lower region of absorbing section 118c as a single feed.

Some circumstances may favor using the cooled second portion (stream 33a in FIGS. 3 and 5) in lieu of the first portion (stream 36) of vapor stream 34 to form stream 38 flowing to the heat exchange means in the lower region of feed cooling section 118a. In such cases, only the cooled first portion (stream 32a) is supplied to separator section 118e (FIG. 3) or separator 12 (FIG. 5), and all of the resulting vapor stream 34 is supplied to work expansion machine 15.

In some circumstances, it may be advantageous to use an external separator vessel to separate cooled feed stream 31a, rather than including separator section 118e in processing assembly 118. As shown in FIGS. 5 and 6, separator 12 can be used to separate cooled feed stream 31a into vapor stream 34 and liquid stream 35.

Depending on the quantity of heavier hydrocarbons in the feed gas and the feed gas pressure, the cooled feed stream 31a entering separator section 118e in FIGS. 3 and 4 or separator 12 in FIGS. 5 and 6 may not contain any liquid (because it is above its dewpoint, or because it is above its cricondenbar). In such cases, there is no liquid in streams 35 and 37 (as shown by the dashed lines), so only the vapor from separator section 118e in stream 36 (FIGS. 3 and 4) or the vapor from separator 12 in stream 36 (FIGS. 5 and 6) flows to stream 38 to become the expanded substantially condensed stream 38b supplied to the heat and mass transfer means in rectifying section 118b. In such circumstances, separator section 118e in processing assembly 118 (FIGS. 3 and 4) or separator 12 (FIGS. 5 and 6) may not be required.

Feed gas conditions, plant size, available equipment, or other factors may indicate that elimination of work expansion machine 15, or replacement with an alternate expansion device (such as an expansion valve), is feasible. Although individual stream expansion is depicted in particular expansion devices, alternative expansion means may be employed where appropriate. For example, conditions may warrant work expansion of the substantially condensed portion of the feed stream (stream 38a).

In accordance with the present invention, the use of external refrigeration to supplement the cooling available to the inlet gas from the distillation vapor and liquid streams may be employed, particularly in the case of a rich inlet gas. In such cases, a heat and mass transfer means may be included in separator section 118e (or gas a collecting means in such cases when the cooled feed stream 31a contains no liquid) as shown by the dashed lines in FIGS. 3 and 4, or a heat and mass transfer means may be included in separator 12 as shown by the dashed lines in FIGS. 5 and 6. This heat and mass transfer means may be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between a refrigerant stream (e.g., propane) flowing through one pass of the heat and mass transfer means and the vapor portion of stream 31a flowing upward, so that the refrigerant further cools the vapor and condenses additional liquid, which falls downward to become part of the liquid removed in stream 35. Alternatively, conventional gas chiller(s) could be used to cool stream 32a, stream 33a, and/or stream 31a with refrigerant before stream 31a enters separator section 118e (FIGS. 3 and 4) or separator 12 (FIGS. 5 and 6).

Depending on the temperature and richness of the feed gas and the amount of $C_2$ components to be recovered in liquid product stream 46, there may not be sufficient heating available from stream 33 to cause the liquid leaving stripping section 118d to meet the product specifications. In such cases, the heat and mass transfer means in stripping section 118d may include provisions for providing supplemental heating with heating medium as shown by the dashed lines in FIGS. 3 and 5. Alternatively, another heat and mass transfer means can be included in the lower region of stripping section 118d for providing supplemental heating, or stream 33 can be heated with heating medium before it is supplied to the heat and mass transfer means in stripping section 118d.

Depending on the type of heat transfer devices selected for the heat exchange means in the upper and lower regions of feed cooling section 118a, it may be possible to combine these heat exchange means in a single multi-pass and/or multi-service heat transfer device. In such cases, the multi-pass and/or multi-service heat transfer device will include appropriate means for distributing, segregating, and collecting stream 32, stream 38, and the distillation vapor stream in order to accomplish the desired cooling and heating. Likewise, the type of heat and mass transfer device selected for the heat and mass transfer means in rectifying section 118b may allow combining it with the heat exchange means in the lower region of feed cooling section 118a (and possibly with the heat exchange means in the upper region of feed cooling section 118a as well) in a single multi-pass and/or multi-service heat and mass transfer device. In such cases, the multi-pass and/or multi-service heat and mass transfer device will include appropriate means for distributing, segregating, and collecting stream 38, stream 38b, and the distillation vapor stream (and optionally stream 32) in order to accomplish the desired cooling and heating.

Some circumstances may favor not providing an absorbing means in the upper region of stripping section 118d. In such cases, a distillation liquid stream is collected from the lower region of absorbing section 118c and directed to the heat and mass transfer means in stripping section 118d.

A less preferred option for the FIGS. 3 and 5 embodiments of the present invention is providing a separator vessel for cooled first portion 32a and a separator vessel for cooled second portion 33a, combining the vapor streams separated therein to form vapor stream 34, and combining the liquid streams separated therein to form liquid stream 35. Another less preferred option for the present invention is cooling stream 37 in a separate heat exchange means inside feed cooling section 118a (rather than combining stream 37 with stream 36 to form combined stream 38), expanding the cooled stream in a separate expansion device, and supplying the expanded stream either to the heat and mass transfer means in rectifying section 118b or to the upper region of absorbing section 118c.

It will be recognized that the relative amount of feed found in each branch of the split vapor feed will depend on several factors, including gas pressure, feed gas composition, the amount of heat which can economically be extracted from the feed, and the quantity of horsepower available. More feed above absorbing section 118c may increase recovery while decreasing power recovered from the expander and thereby increasing the recompression horsepower requirements. Increasing feed below absorbing section 118c reduces the horsepower consumption but may also reduce product recovery.

The present invention provides improved recovery of $C_2$ components, $C_3$ components, and heavier hydrocarbon components or of $C_3$ components and heavier hydrocarbon components per amount of utility consumption required to operate the process. An improvement in utility consumption required for operating the process may appear in the form of reduced power requirements for compression or re-compression, reduced power requirements for external refrigeration, reduced energy requirements for supplemental heating, reduced energy requirements for tower reboiling, or a combination thereof.

While there have been described what are believed to be preferred embodiments of the invention, those skilled in the art will recognize that other and further modifications may be made thereto, e.g. to adapt the invention to various conditions, types of feed, or other requirements without departing from the spirit of the present invention as defined by the following claims.

We claim:

1. A process for the separation of a gas stream containing methane, $C_2$ components, $C_3$ components, and heavier hydrocarbon components into a volatile residue gas fraction and a relatively less volatile fraction containing a major portion of said $C_2$ components, $C_3$ components, and heavier hydrocarbon components or said $C_3$ components and heavier hydrocarbon components wherein (1) said gas stream is divided into first and second portions;
   (2) said first portion is cooled;
   (3) said second portion is cooled;
   (4) said cooled first portion is combined with said cooled second portion to form a cooled gas stream;
   (5) said cooled gas stream is divided into first and second streams;
   (6) said first stream is cooled to condense substantially all of it and is thereafter expanded to lower pressure whereby it is further cooled;
   (7) said expanded cooled first stream is heated and thereafter discharged as a vapor fraction and a liquid fraction;
   (8) said liquid fraction is supplied as a first top feed to an absorbing means housed in a single equipment item processing assembly;
   (9) said second stream is expanded to said lower pressure and is supplied as a bottom feed to said absorbing means;
   (10) a first distillation vapor stream is collected from an upper region of said absorbing means and combined with said vapor fraction to form a combined vapor stream;
   (11) said combined vapor stream is cooled in a first means for providing heat and mass transfer that is housed in said processing assembly, said first means for providing heat and mass transfer being configured to provide heat exchange between
      (a) said combined vapor stream arising from said absorbing means flowing upward through one pass of said first means for providing heat and mass transfer, and
      (b) said expanded cooled first stream flowing downward,
      so that said combined vapor stream is cooled while heating said expanded cooled first stream; wherein as said combined vapor stream is cooled, a portion of said combined vapor stream is condensed and condensed liquid falls downward while remaining distillation vapor continues flowing upward through said first means for providing heat and mass transfer; wherein said first means for providing heat and mass transfer provides continuous contact between said condensed liquid and said remaining distillation vapor so that said first means for providing heat and mass transfer also functions to provide mass transfer between vapor and liquid phases, thereby providing rectification of said remaining distillation vapor; and wherein said first means for providing heat and mass transfer supplies at least a portion of the heating of step (7) while simultaneously condensing the less volatile components from said combined vapor stream, and thereafter collecting said condensed liquid and discharging it as a condensed stream and discharging said remaining distillation vapor as a second distillation vapor stream; wherein said first means for providing heat and mass transfer does not include external reflux equipment items;
   (12) said condensed stream is supplied as a second top feed to said absorbing means;
   (13) said second distillation vapor stream is heated in one or more means for providing heat exchange that is housed in said processing assembly, said one or more means for providing heat exchange being configured to provide heat exchange between
      (a) said first stream flowing through one pass in a lower region of said one or more means for providing heat exchange, and
      (b) said second distillation vapor stream arising from said first means for providing heat and mass transfer inside said processing assembly,
      so that said first stream is cooled to substantial condensation while heating said second distillation vapor stream to form a partially heated second distillation vapor stream; and wherein said one or more means for providing heat exchange is further configured to provide heat exchange between
      (c) said first portion flowing through another pass of said one or more means for providing heat exchange, and (d) said partially heated second distillation vapor stream that has been heated in said lower region of said one or more means for providing heat exchange, wherein said first portion is cooled while further heating said partially heated second distillation vapor stream to form a heated second distillation vapor stream and wherein said one or more means for providing heat exchange supplies at least a portion of the cooling of steps (2) and (6), and thereafter discharging said heated second distillation vapor stream from said processing assembly as said volatile residue gas fraction; wherein said one or more means for providing heat exchange means does not include external reflux equipment items;

(14) a distillation liquid stream is collected from a lower region of said absorbing means and heated in a second means for providing heat and mass transfer that is housed in said processing assembly, said second means for providing heat and mass transfer being configured to provide heat exchange between
   (a) said second portion flowing through one pass of said second means for providing heat and mass transfer, and
   (b) said distillation liquid stream flowing downward from said lower region of said absorbing means,
   so that said second portion is cooled while heating said distillation liquid stream before it leaves said second means for providing heat and mass transfer; and wherein as said distillation liquid stream is heated, a portion of it is vaporized to form stripping vapors that rise upward as remaining liquid continues flowing downward through said second means for providing heat and mass transfer; and wherein said second means for providing heat and mass transfer provides continuous contact between said stripping vapors and said remaining liquid so that said second means for providing heat and mass transfer also functions to provide mass transfer between vapor and liquid phases, stripping said remaining liquid of methane and lighter components; and wherein said second means for providing heat and mass transfer supplies at least a portion of the cooling of step (3) while simultaneously stripping the more volatile components from said distillation liquid stream, and thereafter discharging said heated and stripped remaining liquid from said processing assembly as said relatively less volatile fraction; wherein said second means for providing heat and mass transfer does not include external reboilers; and

(15) the quantities and temperatures of said feed streams to said absorbing means are effective to maintain the temperature of said upper region of said absorbing means at a temperature whereby the major portions of the components in said relatively less volatile fraction are recovered.

2. The process according to claim 1 wherein
(a) said cooled first portion is combined with said cooled second portion to form a partially condensed gas stream;
(b) said partially condensed gas stream is supplied to a separating means and is separated therein to provide a vapor stream and at least one liquid stream;
(c) said vapor stream is divided into said first and second streams; and
(d) at least a portion of said at least one liquid stream is expanded to said lower pressure and is supplied as a feed to said processing assembly below said absorbing means and above said second heat and mass transfer means.

3. The process according to claim 2 wherein
(a) said first stream is combined with said at least one liquid stream to form a combined stream;
(b) said combined stream is cooled to condense substantially all of it and is thereafter expanded to lower pressure whereby it is further cooled; and
(c) said expanded cooled combined stream is heated and thereafter discharged as a vapor fraction and a liquid fraction.

4. The process according to claim 1 wherein
(a) said gas stream is cooled;
(b) said cooled gas stream is divided into said first and second streams;
(c) said second distillation vapor stream is heated in said one or more means for providing heat exchange that is housed in said processing assembly, said one or more means for providing heat exchange being configured to provide heat exchange between
   (i) said first stream flowing through one pass in a lower region of said one or more means for providing heat exchange, and
   (ii) said second distillation vapor stream arising from said first means for providing heat and mass transfer inside said processing assembly,
   so that said first stream is cooled to substantial condensation while heating said second distillation vapor stream to form a partially heated second distillation vapor stream, and wherein said one or more means for providing heat exchange is further configured to provide heat exchange between
   (iii) said gas stream flowing through another pass of said one or more means for providing heat exchange, and
   (iv) said partially heated second distillation vapor stream that has been heated in said lower region of said one or more means for providing heat exchange,
   wherein said gas stream is cooled while further heating said partially heated second distillation vapor stream to form a heated second distillation vapor stream and wherein said one or more means for providing heat exchange supplies at least a portion of the cooling of steps (a) and (c) (ii), and thereafter discharging said heated second distillation vapor stream from said processing assembly as said volatile residue gas fraction, wherein said one or more means for providing heat exchange means does not include external reflux equipment items; and
(d) the distillation liquid stream is collected from the lower region of said absorbing means and heated in the second means for providing heat and mass transfer that is housed in said processing assembly, said second means for providing heat and mass transfer being configured to provide heat exchange between
   (i) a heating medium flowing through one pass of said second means for providing heat and mass transfer, and
   (ii) said distillation liquid stream flowing downward from said lower region of said absorbing means,
   so that said heating medium is cooled while heating said distillation liquid stream before it leaves said second means for providing heat and mass transfer, and wherein as said distillation liquid stream is heated, a portion of it is vaporized to form stripping vapors that rise upward as remaining liquid continues flowing downward through said second means for providing heat and mass transfer; and wherein said second means for providing heat and mass transfer provides continuous contact between said stripping vapors and said remaining liquid so that said second means for providing heat and mass transfer also functions to provide mass transfer between vapor and liquid phases, stripping said remaining liquid of methane, $C_2$ components, and lighter components, and thereafter discharging said heated and stripped remaining liquid from said processing assembly as said relatively less volatile fraction; wherein said second means for providing heat and mass transfer does not include external reboilers.

5. The process according to claim 4 wherein
(a) said gas stream is cooled sufficiently to partially condense it;
(b) said partially condensed gas stream is supplied to a separating means and is separated therein to provide a vapor stream and at least one liquid stream;
(c) said vapor stream is divided into said first and second streams; and
(d) at least a portion of said at least one liquid stream is expanded to said lower pressure and is supplied as a feed to said processing assembly below said absorbing means and above said second heat and mass transfer means.

6. The process according to claim 5 wherein
(a) said first stream is combined with said at least one liquid stream to form a combined stream;
(b) said combined stream is cooled to condense substantially all of it and is thereafter expanded to lower pressure whereby it is further cooled; and
(c) said expanded cooled combined stream is heated and thereafter discharged as a vapor fraction and a liquid fraction.

7. The process according to claim 2 wherein said separating means is housed in said processing assembly.

8. The process according to claim 3 wherein said separating means is housed in said processing assembly.

9. The process according to claim 5 wherein said separating means is housed in said processing assembly.

10. The process according to claim 6 wherein said separating means is housed in said processing assembly.

11. The process according to claim 1 wherein
(1) A gas collecting means is housed in said processing assembly;
(2) an additional means for providing heat and mass transfer is included inside said gas collecting means, said additional means for providing heat and mass transfer including one or more passes for an external refrigeration medium;
(3) said cooled gas stream is supplied to said gas collecting means and directed to said additional means for providing heat and mass transfer to be further cooled by said external refrigeration medium; and
(4) said further cooled gas stream is divided into said first and second streams.

12. The process according to claim 4 wherein
(1) A gas collecting means is housed in said processing assembly;
(2) an additional means for providing heat and mass transfer is included inside said gas collecting means, said additional means for providing heat and mass transfer including one or more passes for an external refrigeration medium;
(3) said cooled gas stream is supplied to said gas collecting means and directed to said additional means for providing heat and mass transfer to be further cooled by said external refrigeration medium; and
(4) said further cooled gas stream is divided into said first and second streams.

13. The process according to claim 2, 3, 7 or 8 wherein
(1) an additional means for providing heat and mass transfer is included inside said separating means, said additional means for providing heat and mass transfer including one or more passes for an external refrigeration medium;
(2) said vapor stream is directed to said additional means for providing heat and mass transfer to be cooled by said external refrigeration medium to form additional condensate; and
(3) said additional condensate becomes a part of said at least one liquid stream separated therein.

14. The process according to claim 5, 6, 9 or 10 wherein
(1) an additional means for providing heat and mass transfer is included inside said separating means, said additional means for providing heat and mass transfer including one or more passes for an external refrigeration medium;
(2) said vapor stream is directed to said additional means for providing heat and mass transfer to be cooled by said external refrigeration medium to form additional condensate; and
(3) said additional condensate becomes a part of said at least one liquid stream separated therein.

15. The process according to claim 1 wherein
(1) an additional absorbing means is included inside said processing assembly above said second means for providing heat and mass transfer;
(2) said additional absorbing means is configured to provide contacting of said distillation liquid stream from said absorbing means with said stripped more volatile components from said second means for providing heat and mass transfer, thereby forming a third distillation vapor stream and a partially stripped distillation liquid stream;
(3) said third distillation vapor stream is supplied to said lower region of said absorbing means; and
(4) said partially stripped distillation liquid stream is supplied to said second means for providing heat and mass transfer to be heated, thereby further stripping it to form said heated and stripped remaining liquid that is discharged from said processing assembly as said relatively less volatile fraction.

16. The process according to claim 4, 5, 6, 9, 10, or 12 wherein
(1) an additional absorbing means is included inside said processing assembly above said second means for providing heat and mass transfer;
(2) said additional absorbing means is configured to provide contacting of said distillation liquid stream from said absorbing means with said stripped more volatile components from said second means for providing heat and mass transfer, thereby forming a third distillation vapor stream and a partially stripped distillation liquid stream;
(3) said third distillation vapor stream is supplied to said lower region of said absorbing means; and
(4) said partially stripped distillation liquid stream is supplied to said second means for providing heat and mass transfer to be heated, thereby further stripping it to form said heated and stripped distillation liquid stream that is discharged from said processing assembly as said relatively less volatile fraction.

17. The process according to claim 13 wherein
(1) an additional absorbing means is included inside said processing assembly above said second means for providing heat and mass transfer;
(2) said additional absorbing means is configured to provide contacting of said distillation liquid stream from said absorbing means with said stripped more volatile components from said second means for providing heat and mass transfer, thereby forming a third distillation vapor stream and a partially stripped distillation liquid stream;
(3) said third distillation vapor stream is supplied to said lower region of said absorbing means; and
(4) said partially stripped distillation liquid stream is supplied to said second means for providing heat and mass transfer to be heated, thereby further stripping it to form said heated and stripped distillation liquid stream that is discharged from said processing assembly as said relatively less volatile fraction.

18. The process according to claim 14 wherein
(1) an additional absorbing means is included inside said processing assembly above said means for providing second heat and mass transfer;
(2) said additional absorbing means is configured to provide contacting of said distillation liquid stream from said absorbing means with said stripped more volatile components from said second means for providing heat and mass transfer, thereby forming a third distillation vapor stream and a partially stripped distillation liquid stream;
(3) said third distillation vapor stream is supplied to said lower region of said absorbing means; and
(4) said partially stripped distillation liquid stream is supplied to said second means for providing heat and mass transfer to be heated, thereby further stripping it to form said heated and stripped distillation liquid stream that is discharged from said processing assembly as said relatively less volatile fraction.

19. The process according to claim 1 wherein said second means for providing heat and mass transfer includes one or more passes for an external heating medium to supplement the heating supplied by said second portion for said stripping of said more volatile components from said distillation liquid stream.

20. The process according to claim 13 wherein said second means for providing heat and mass transfer includes one or more passes for an external heating medium to supplement the heating supplied by said second portion for said stripping of said more volatile components from said distillation liquid stream.

21. The process according to claim 15 wherein said second means for providing heat and mass transfer includes one or more passes for an external heating medium to supplement the heating supplied by said second portion for said stripping of said more volatile components from said distillation liquid stream.

22. The process according to claim 17 wherein said second means for providing heat and mass transfer includes one or more passes for an external heating medium to supplement the heating supplied by said second portion for said stripping of said more volatile components from said distillation liquid stream.

23. An apparatus for the separation of a gas stream containing methane, $C_2$ components, $C_3$ components, and heavier hydrocarbon components into a volatile residue gas fraction and a relatively less volatile fraction containing a major portion of said $C_2$ components, $C_3$ components, and heavier hydrocarbon components or said $C_3$ components and heavier hydrocarbon components comprising
(1) first dividing means to divide said gas stream into first and second portions;
(2) one or more means for providing heat exchange housed in a single equipment item processing assembly and connected to said first dividing means to receive said first portion and cool it;
(3) first means for providing heat and mass transfer housed in said processing assembly and connected to said first dividing means to receive said second portion and cool it;
(4) first combining means connected to said one or more means for providing heat exchange and said first means for providing heat and mass transfer to receive said cooled first portion and said cooled second portion and form a cooled gas stream;
(5) second dividing means connected to said first combining means to receive said cooled gas stream and divide it into first and second streams;
(6) said one or more means for providing heat exchange housed in said processing assembly and connected to said second dividing means to receive said first stream and cool it sufficiently to substantially condense it;
(7) first expansion means connected to said one or more means for providing heat exchange to receive said substantially condensed first stream and expand it to lower pressure;
(8) second means for providing heat and mass transfer housed in said processing assembly and connected to said first expansion means to receive said expanded cooled first stream and heat it, and thereafter discharging said heated expanded first stream as a vapor fraction and a liquid fraction;
(9) absorbing means housed in said processing assembly and connected to said second means for providing heat and mass transfer to receive said liquid fraction as a first top feed thereto;
(10) second expansion means connected to said second dividing means to receive said second stream and expand it to said lower pressure, said second expansion means being further connected to said absorbing means to supply said expanded second stream as a bottom feed thereto;
(11) vapor collecting means housed in said processing assembly and connected to said absorbing means to receive a first distillation vapor stream from an upper region of said absorbing means;
(12) second combining means housed in said processing assembly and connected to said vapor collecting means and said second means for providing heat and mass transfer to receive said first distillation vapor stream and said vapor fraction and form a combined vapor stream;
(13) said second means for providing heat and mass transfer being further connected to said second combining means to receive said combined vapor stream and cool it, said second means for providing heat and mass transfer being configured to provide heat exchange between
 (a) said combined vapor stream arising from said absorbing means flowing upward through one pass of said second means for providing heat and mass transfer, and
 (b) said expanded cooled first stream flowing downward, so that said combined vapor stream is cooled while heating said expanded cooled first stream, wherein as said combined vapor stream is cooled, a portion of said combined vapor stream is condensed and condensed liquid falls downward while remaining distillation vapor continues flowing upward through said second means for providing heat and mass transfer; wherein said second means for providing heat and mass transfer provides continuous contact between said condensed liquid and said remaining distillation vapor so that said second means for providing heat and mass transfer also functions to provide mass transfer between vapor and liquid phases, thereby providing rectification of said remaining distillation vapor; and wherein said second means for providing heat and mass transfer supplies at least a portion of the heating of step (8) while simultaneously condensing the less volatile components from said combined vapor stream, and thereafter collecting said condensed liquid and discharging it as a condensed stream and discharging said remaining distillation vapor as a second distillation vapor stream, wherein said second means for providing heat and mass transfer does not include external reflux equipment items;

(14) said absorbing means being further connected to said second means for providing heat and mass transfer to receive said condensed stream as a second top feed thereto;

(15) said one or more means for providing heat exchange being further connected to said second means for providing heat and mass transfer to receive said second distillation vapor stream and heat it, said one or more means for providing heat exchange being configured to provide heat exchange between
  (a) said first stream flowing through one pass in a lower region of said one or more means for providing heat exchange, and
  (b) said second distillation vapor stream arising from said second means for providing heat and mass transfer inside said processing assembly,
so that said first stream is cooled to substantial condensation while heating said second distillation vapor stream to form a partially heated second distillation vapor stream; and wherein said one or more means for providing heat exchange is further configured to provide heat exchange between
  (c) said first portion flowing through another pass of said one or more means for providing heat exchange, and
  (d) said partially heated second distillation vapor stream that has been heated in said lower region of said one or more means for providing heat exchange,
wherein said first portion is cooled while further heating said partially heated second distillation vapor stream to form a heated second distillation vapor stream and wherein said one or more means for providing heat exchange supplies at least a portion of the cooling of steps (2) and (6), and thereafter discharging said heated second distillation vapor stream from said processing assembly as said volatile residue gas fraction; wherein said one or more means for providing heat exchange means does not include external reflux equipment items;

(16) liquid collecting means housed in said processing assembly and connected to said absorbing means to receive a distillation liquid stream from a lower region of said absorbing means;

(17) said first heat and mass transfer means being further connected to said liquid collecting means to receive said distillation liquid stream and heat it, said first means for providing heat and mass transfer being configured to provide heat exchange between
  (a) said second portion flowing through one pass of said first means for providing heat and mass transfer, and
  (b) said distillation liquid stream flowing downward from said lower region of said absorbing means,
so that said second portion is cooled while heating said distillation liquid stream before it leaves said first means for providing heat and mass transfer; and wherein as said distillation liquid stream is heated, a portion of it is vaporized to form stripping vapors that rise upward as remaining liquid continues flowing downward through said first means for providing heat and mass transfer; and wherein said first means for providing heat and mass transfer provides continuous contact between said stripping vapors and said remaining liquid so that said first means for providing heat and mass transfer also functions to provide mass transfer between vapor and liquid phases, stripping said remaining liquid of methane and lighter components; and wherein said first means for providing heat and mass transfer supplies at least a portion of the cooling of step (3) while simultaneously stripping the more volatile components from said distillation liquid stream, and thereafter discharging said heated and stripped remaining liquid from said processing assembly as said relatively less volatile fraction; wherein said first means for providing heat and mass transfer does not include external reboilers; and

(18) control means adapted to regulate the quantities and temperatures of said feed streams to said absorbing means to maintain the temperature of said upper region of said absorbing means at a temperature whereby the major portions of the components in said relatively less volatile fraction are recovered.

24. The apparatus according to claim 23 wherein
(a) said first combining means is connected to said one or more means for providing heat exchange and said first means for providing heat and mass transfer to receive said cooled first portion and said cooled second portion and form a partially condensed gas stream;
(b) separating means is connected to said first combining means to receive said partially condensed gas stream and separate it into a vapor stream and at least one liquid stream;
(c) said second dividing means is connected to said separating means to receive said vapor stream and divide it into said first and second streams; and
(d) third expansion means is connected to said separating means to receive at least a portion of said at least one liquid stream and expand it to said lower pressure, said third expansion means is further connected to said processing assembly to supply said expanded liquid stream as a feed thereto below said absorbing means and above said first means for providing heat and mass transfer.

25. The apparatus according to claim 24 wherein
(a) third combining means is connected to said second dividing means and said separating means to receive said first stream and said at least one liquid stream and form a combined stream;

(b) said one or more means for providing heat exchange is connected to said third combining means to receive said combined stream and cool it sufficiently to substantially condense it;
(c) said first expansion means is connected to said one or more means for providing heat exchange to receive said substantially condensed combined stream and expand it to lower pressure; and
(d) said second means for providing heat and mass transfer is connected to said first expansion means to receive said expanded cooled combined stream and heat it, and thereafter discharging said heated expanded combined stream as a vapor fraction and a liquid fraction.

26. The apparatus according to claim 23 wherein
(a) said one or more means for providing heat exchange is housed in said processing assembly to cool said gas stream;
(b) said second dividing means is connected to said one or more means for providing heat exchange to receive said cooled gas stream and divide it into said first and second streams;
(c) said second distillation vapor stream is heated in said one or more means for providing heat exchange that is housed in said processing assembly, said one or more means for providing heat exchange being configured to provide heat exchange between
 (i) said first stream flowing through one pass in a lower region of said one or more means for providing heat exchange, and
 (ii) said second distillation vapor stream arising from said second means for providing heat and mass transfer inside said processing assembly,
 so that said first stream is cooled to substantial condensation while heating said second distillation vapor stream to form a partially heated second distillation vapor stream, and wherein said one or more means for providing heat exchange is further configured to provide heat exchange between
 (iii) said gas stream flowing through another pass of said one or more means for providing heat exchange, and
 (iv) said partially heated second distillation vapor stream that has been heated in said lower region of said one or more means for providing heat exchange,
 wherein said gas stream is cooled while further heating said partially heated second distillation vapor stream to form a heated second distillation vapor stream and wherein said one or more means for providing heat exchange supplies at least a portion of the cooling of steps (a) and (c)(ii), and thereafter discharging said heated second distillation vapor stream from said processing assembly as said volatile residue gas fraction; wherein said one or more means for providing heat exchange means does not include external reflux equipment items; and
(d) said first means for providing heat and mass transfer is connected to said liquid collecting means to receive said distillation liquid stream and heat it, said first means for providing heat and mass transfer being configured to provide heat exchange between
 (i) a heating medium flowing through one pass of said first means for providing heat and mass transfer, and
 (ii) said distillation liquid stream flowing downward from said lower region of said absorbing means,
 so that said heating medium is cooled while heating said distillation liquid stream before it leaves said first means for providing heat and mass transfer; and wherein as said distillation liquid stream is heated, a portion of it is vaporized to form stripping vapors that rise upward as remaining liquid continues flowing downward through said first means for providing heat and mass transfer; and wherein said first means for providing heat and mass transfer provides continuous contact between said stripping vapors and said remaining liquid so that said first means for providing heat and mass transfer also functions to provide mass transfer between vapor and liquid phases, stripping said remaining liquid of methane, $C_2$ components, and lighter components; and thereafter discharging said heated and stripped remaining liquid from said processing assembly as said relatively less volatile fraction; wherein said first means for providing heat and mass transfer does not include external reboilers.

27. The apparatus according to claim 26 wherein
(a) said one or more means for providing heat exchange is housed in the processing assembly to cool said gas stream sufficiently to partially condense it;
(b) separating means is connected to said one or more means for providing heat exchange to receive said partially condensed gas stream and separate it into a vapor stream and at least one liquid stream;
(c) said second dividing means is connected to said separating means to receive said vapor stream and divide it into said first and second streams; and
(d) third expansion means is connected to said separating means to receive at least a portion of said at least one liquid stream and expand it to said lower pressure, said third expansion means being further connected to said processing assembly to supply said expanded liquid stream as a feed thereto below said absorbing means and above said first means for providing heat and mass transfer.

28. The apparatus according to claim 27 wherein
(a) further combining means is connected to said dividing means and said separating means to receive said first stream and said at least one liquid stream and form a combined stream;
(b) said one or more means for providing heat exchange is connected to said further combining means to receive said combined stream and cool it sufficiently to substantially condense it;
(c) said first expansion means is connected to said one or more means for providing heat exchange to receive said substantially condensed combined stream and expand it to lower pressure; and
(d) said second means for providing heat and mass transfer is connected to said first expansion means to receive said expanded cooled combined stream and heat it, and thereafter discharging said heated expanded combined stream as a vapor fraction and a liquid fraction.

29. The apparatus according to claim 24 wherein said separating means is housed in said processing assembly.

30. The apparatus according to claim 25 wherein said separating means is housed in said processing assembly.

31. The apparatus according to claim 27 wherein said separating means is housed in said processing assembly.

32. The apparatus according to claim 28 wherein said separating means is housed in said processing assembly.

33. The apparatus according to claim 23 wherein
(1) a gas collecting means is housed in said processing assembly;

(2) an additional means for providing heat and mass transfer is included inside said gas collecting means, said additional means for providing heat and mass transfer including one or more passes for an external refrigeration medium;
(3) said gas collecting means is connected to said first combining means to receive said cooled gas stream and direct it to said additional means for providing heat and mass transfer to be further cooled by said external refrigeration medium; and
(4) said first dividing means is adapted to be connected to said gas collecting means to receive said further cooled gas stream and divide it into said first and second streams.

34. The apparatus according to claim 26 wherein
(1) a gas collecting means is housed in said processing assembly;
(2) an additional means for providing heat and mass transfer is included inside said gas collecting means, said additional means for providing heat and mass transfer including one or more passes for an external refrigeration medium;
(3) said gas collecting means is connected to said one or more means for providing heat exchange to receive said cooled gas stream and direct it to said additional means for providing heat and mass transfer to be further cooled by said external refrigeration medium; and
(4) said dividing means is adapted to be connected to said gas collecting means to receive said further cooled gas stream and divide it into said first and second streams.

35. The apparatus according to claim 24, 25, 29, or 30 wherein
(1) an additional means for providing heat and mass transfer is included inside said separating means, said additional means for providing heat and mass transfer including one or more passes for an external refrigeration medium;
(2) said vapor stream is directed to said additional means for providing heat and mass transfer to be cooled by said external refrigeration medium to form additional condensate; and
(3) said additional condensate becomes a part of said at least one liquid stream separated therein.

36. The apparatus according to claim 27, 28, 31, or 32 wherein
(1) an additional means for providing heat and mass transfer is included inside said separating means, said additional means for providing heat and mass transfer including one or more passes for an external refrigeration medium;
(2) said vapor stream is directed to said additional means for providing heat and mass transfer to be cooled by said external refrigeration medium to form additional condensate; and
(3) said additional condensate becomes a part of said at least one liquid stream separated therein.

37. The apparatus according to claim 23, 24, 25, 29, 30 or 33 wherein
(1) an additional absorbing means is included inside said processing assembly above said first means for providing heat and mass transfer and connected to said first means for providing heat and mass transfer to receive said stripped more volatile components;
(2) said additional absorbing means is further connected to said liquid collecting means to receive said distillation liquid stream and provide contacting of said distillation liquid stream with said stripped more volatile components, thereby forming a third distillation vapor stream and a partially stripped distillation liquid stream;
(3) said absorbing means is adapted to be connected to said additional absorbing means to receive said third distillation vapor stream and supply it to said lower region of said absorbing means; and
(4) said first means for providing heat and mass transfer is adapted to be connected to said additional absorbing means to receive said partially stripped distillation liquid stream and heat it, thereby further stripping it to form said heated and stripped distillation liquid stream that is discharged from said processing assembly as said relatively less volatile fraction.

38. The apparatus according to claim 26, 27, 28, 31, 32 or 34 wherein
(1) an additional absorbing means is included inside said processing assembly above said first means for providing heat and mass transfer and connected to said first means for providing heat and mass transfer to receive said stripped more volatile components;
(2) said additional absorbing means is further connected to said liquid collecting means to receive said distillation liquid stream and provide contacting of said distillation liquid stream with said stripped more volatile components, thereby forming a third distillation vapor stream and a partially stripped distillation liquid stream;
(3) said absorbing means is adapted to be connected to said additional absorbing means to receive said third distillation vapor stream and supply it to said lower region of said absorbing means; and
(4) said first means for providing heat and mass transfer is adapted to be connected to said additional absorbing means to receive said partially stripped distillation liquid stream and heat it, thereby further stripping it to form said heated and stripped distillation liquid stream that is discharged from said processing assembly as said relatively less volatile fraction.

39. The apparatus according to claim 35 wherein
(1) an additional absorbing means is included inside said processing assembly above said first means for providing heat and mass transfer and connected to said first means for providing heat and mass transfer to receive said stripped more volatile components;
(2) said additional absorbing means is further connected to said liquid collecting means to receive said distillation liquid stream and provide contacting of said distillation liquid stream with said stripped more volatile components, thereby forming a third distillation vapor stream and a partially stripped distillation liquid stream;
(3) said absorbing means is adapted to be connected to said additional absorbing means to receive said third distillation vapor stream and supply it to said lower region of said absorbing means; and
(4) said first means for providing heat and mass transfer is adapted to be connected to said additional absorbing means to receive said partially stripped distillation liquid stream and heat it, thereby further stripping it to form said heated and stripped distillation liquid stream that is discharged from said processing assembly as said relatively less volatile fraction.

40. The apparatus according to claim 36 wherein
(1) an additional absorbing means is included inside said processing assembly above said first means for providing heat and mass transfer and connected to said first means for providing heat and mass transfer to receive said stripped more volatile components;

(2) said additional absorbing means is further connected to said liquid collecting means to receive said distillation liquid stream and provide contacting of said distillation liquid stream with said stripped more volatile components, thereby forming a third distillation vapor stream and a partially stripped distillation liquid stream;

(3) said absorbing means is adapted to be connected to said additional absorbing means to receive said third distillation vapor stream and supply it to said lower region of said absorbing means; and (4) said first means for providing heat and mass transfer is adapted to be connected to said additional absorbing means to receive said partially stripped distillation liquid stream and heat it, thereby further stripping it to form said heated and stripped distillation liquid stream that is discharged from said processing assembly as said relatively less volatile fraction.

41. The apparatus according to claim 23, 24, 25, 29, 30, or 33 wherein said first means for providing heat and mass transfer includes one or more passes for an external heating medium to supplement the heating supplied by said second portion for said stripping of said more volatile components from said distillation liquid stream.

42. The apparatus according to claim 35 wherein said first means for providing heat and mass transfer includes one or more passes for an external heating medium to supplement the heating supplied by said second portion for said stripping of said more volatile components from said distillation liquid stream.

43. The apparatus according to claim 37 wherein said first means for providing heat and mass transfer includes one or more passes for an external heating medium to supplement the heating supplied by said second portion for said stripping of said more volatile components from said distillation liquid stream.

44. The apparatus according to claim 39 wherein said first means for providing heat and mass transfer includes one or more passes for an external heating medium to supplement the heating supplied by said second portion for said stripping of said more volatile components from said distillation liquid stream.

45. The process according to the claim 2 wherein
(a) said first stream is combined with a portion of said at least one liquid stream to form a combined stream;
(b) said combined stream is cooled to condense substantially all of it and is thereafter expanded to lower pressure whereby it is further cooled,
(c) said expanded cooled combined stream is heated and thereafter discharged as a vapor fraction and a liquid fraction, and
(d) a remaining portion of said at least one liquid stream is expanded to said lower pressure and is supplied as a feed to said processing assembly below said absorbing means and above said second means for providing head and mass transfer.

46. The process according to claim 5 wherein
(a) said first stream is combined with a portion of said at least one liquid stream to form a combined stream;
(b) said combined stream is cooled to condense substantially all of it and is thereafter expanded to lower pressure whereby it is further cooled;
(c) said expanded cooled combined stream is heated and thereafter discharged as a vapor fraction and a liquid fraction; and
(d) a remaining portion of said at least one liquid stream is expanded to said lower pressure and is supplied as a feed to said processing assembly below and absorbing means and above said second means for providing heat and mass transfer.

47. The apparatus according to claim 24 wherein
(a) third combining means is connected to said dividing means and said separating means to receive said first stream and a portion of said at least one liquid stream and form a combined stream;
(b) said one or more means for providing heat exchange is connected to said second combining means to receive said combined stream and cool it sufficiently to substantially condense it;
(c) said first expansion means is connected to said one or more means for providing heat exchange to receive said substantially condensed combined stream and expand it to lower pressure;
(d) said second means for providing heat and mass transfer is connected to said first expansion means to receive said expanded cooled combined stream and heat it, and thereafter discharging said heated expanded combined stream as a vapor fraction and a liquid fraction; and
(e) said third expansion means is connected to said separating means to receive a remaining portion of said at least one liquid stream and expand it to said lower pressure, said third expansion means is further connected to said processing assembly to supply said expanded liquid stream as a feed thereto below said absorbing means and above said first means for providing heat and mass transfer.

48. The apparatus according to claim 27 wherein
(a) further combining means is connected to said dividing means and said separating means to receive said first stream and a portion of said at least one liquid stream and form a combined stream;
(b) said one or more means for providing heat exchange is connected to said further combining means to receive said combined stream and cool it sufficiently to substantially condense it;
(c) said first expansion means is connected to said one or more means for providing heat exchange to receive said substantially condensed combined stream and expand it to lower pressure;
(d) said second means for providing heat and mass transfer is connected to said first expansion means to receive said expanded cooled combined stream and heat it, and thereafter discharging said heated expanded combined stream as a vapor fraction and a liquid fraction; and
(e) said third expansion means is connected to said separating means to receive a remaining portion of said at least one liquid stream and expand it to said lower pressure, said third expansion means being further connected to said processing assembly to supply said expanded liquid stream as a feed thereto below said absorbing means and above said first means for providing heat and mass transfer.

* * * * *

UNITED STATES PATENT AND TRADEMARK OFFICE
CERTIFICATE OF CORRECTION

| | |
|---|---|
| PATENT NO. | : 9,933,207 B2 |
| APPLICATION NO. | : 12/772472 |
| DATED | : April 3, 2018 |
| INVENTOR(S) | : Andrew F. Johnke et al. |

It is certified that error appears in the above-identified patent and that said Letters Patent is hereby corrected as shown below:

In the Specification

Column 16:
Line 9, "gas" should be deleted.

In the Claims

Column 32:
Line 6, "and absorbing" should read --said absorbing--.

Signed and Sealed this
Seventeenth Day of July, 2018

Andrei Iancu
*Director of the United States Patent and Trademark Office*